(12) United States Patent
Xiong et al.

(10) Patent No.: US 10,425,868 B2
(45) Date of Patent: Sep. 24, 2019

(54) APPARATUS, SYSTEM, AND METHOD FOR PREVENTING TCP CONNECTION INTERRUPTION

(71) Applicant: Huawei Technologies Co., Ltd., Shenzhen, Guangdong (CN)

(72) Inventors: Chunshan Xiong, Beijing (CN); Anni Wei, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 175 days.

(21) Appl. No.: 15/625,404

(22) Filed: Jun. 16, 2017

(65) Prior Publication Data

US 2017/0289872 A1 Oct. 5, 2017

Related U.S. Application Data

(63) Continuation of application No. PCT/CN2014/094340, filed on Dec. 19, 2014.

(51) Int. Cl.
*H04W 4/00* (2018.01)
*H04W 36/02* (2009.01)
*H04L 29/08* (2006.01)
*H04W 80/06* (2009.01)
*H04W 36/00* (2009.01)

(52) U.S. Cl.
CPC ....... *H04W 36/023* (2013.01); *H04L 67/2842* (2013.01); *H04W 36/0011* (2013.01); *H04W 80/06* (2013.01)

(58) Field of Classification Search
USPC .......................................... 370/331
See application file for complete search history.

(56) References Cited

U.S. PATENT DOCUMENTS

| 6,987,729 B1* | 1/2006 | Gopalakrishnan .... H04W 72/02 370/230 |
| 10,263,669 B2* | 4/2019 | Vaze ...................... H04B 17/29 |
| 2011/0075633 A1* | 3/2011 | Johansson ............. H04W 36/02 370/331 |

(Continued)

FOREIGN PATENT DOCUMENTS

| CN | 101237681 A | 8/2008 |
| CN | 102026281 A | 4/2011 |

(Continued)

*Primary Examiner* — Chuong T Ho
(74) *Attorney, Agent, or Firm* — Staas & Halsey LLP

(57) ABSTRACT

The present invention provides an apparatus, a system, and a method for preventing TCP connection interruption. The apparatus determines that user equipment UE needs cell handover; and the apparatus sends a first instruction message to a server, where the first instruction message is used to instruct the server to stop sending downlink data to the proxy device, and sends cached downlink data to the UE. Therefore, the following problem is avoided: After UE is disconnected from a source cell and is connected to a new cell, because the UE does not receive partial downlink data cached by a TCP proxy or because partial cached data is lost, the UE initiates retransmission to a server, but the server does not retransmit an acknowledged packet according to a TCP protocol, causing TCP connection interruption and service interruption.

15 Claims, 17 Drawing Sheets

(56) References Cited

U.S. PATENT DOCUMENTS

| | | | |
|---|---|---|---|
| 2011/0250893 A1* | 10/2011 | Lee | H04W 24/10 |
| | | | 455/437 |
| 2013/0176847 A1 | 7/2013 | Zhao et al. | |
| 2014/0064249 A1 | 3/2014 | Lee et al. | |
| 2015/0296418 A1* | 10/2015 | Szilagyi | H04W 36/0016 |
| | | | 370/331 |
| 2015/0365483 A1 | 12/2015 | Xiong et al. | |

FOREIGN PATENT DOCUMENTS

| | | |
|---|---|---|
| CN | 102340508 A | 2/2012 |
| CN | 102611717 A | 7/2012 |
| CN | 102891883 A | 1/2013 |
| WO | 2014131153 A1 | 9/2014 |

\* cited by examiner

APPARATUS, SYSTEM, AND METHOD FOR PREVENTING TCP CONNECTION INTERRUPTION

CROSS-REFERENCE TO RELATED APPLICATIONS

This application is a continuation of International Application No. PCT/CN2014/094340, filed on Dec. 19, 2014, the disclosure of which is hereby incorporated by reference in its entirety.

TECHNICAL FIELD

The present invention relates to the communications field, and in particular, to an apparatus, a system, and a method for preventing TCP connection interruption.

BACKGROUND

A Transmission Control Protocol/Internet Protocol (Transmission Control Protocol/Internet Protocol, TCP/IP) is a basis of a contemporary Internet and has been widely applied. With development of an IP-based technology, it is increasingly popular that a user accesses Internet content by using an IP-based mobile communications network such as Long Term Evolution (LTE), a Universal Mobile Telecommunications System (UMTS), or Worldwide Interoperability for Microwave Access (WiMax). A TCP connection between a client and an Internet server needs to be established by using a 3rd Generation Partnership Project (3GPP) network. The client is connected to a mobile communications network by using a radio link. The mobile communications network is usually connected to the Internet server by using a wired network. A status of a wireless communications network fluctuates with time. For example, a data transmission rate and a packet loss rate between the client and the mobile communications network intensely vary with time. On a basis of this, the TCP/IP protocol provides a congestion control mechanism. When the status of the wireless network becomes poor, a corresponding congestion control solution is automatically used according to the TCP/IP, so as to adjust a transmission policy. However, the status of the wireless network changes more intensely than that of the wired network, and a used transmission adjustment policy such as a congestion control policy should be different, so as to improve wireless interface transmission performance, and improve a network throughput. In addition, a TCP connection transmission rate depends, to a large extent, on a rate at which an acknowledgment (ACK) packet is received on a server. A delay between the client and the server not only affects a transmission rate of a normal packet, but also greatly affects a transmission rate of an acknowledgment packet. Therefore, a network proxy technology needs to be introduced to divide a TCP/IP connection between the client and the Internet server into two parts, and a network proxy device establishes a TCP connection to each of the client and the Internet server, so as to implement the TCP connection between the client and the Internet server. In an existing network proxy technology, when a data transmission rate between the Internet server and the network proxy device is greater than a data transmission rate between the network proxy device and the client, or a data transmission rate between the network proxy device and the client is greater than a data transmission rate between the Internet server and the network proxy device, partial data is cached into the network proxy device within a time period.

However, the client is mobile. When moving from a source cell to a target cell, because the client is not handed over in a timely manner for some reasons, the client needs to perform reconnection by using the target cell. After the client is disconnected from the source cell and is reconnected to the target cell, data cached by a network proxy device enabled in the source cell is not sent to the client or the Internet server in a timely manner. According to the existing TCP protocol, the client repeatedly requests retransmission of the data, but the server considers that the client has received the data, and does not perform retransmission; or the server repeatedly requests retransmission of the data, but the client considers that the server has received the data. Consequently, the TCP/IP connection between the client and the Internet server is interrupted, and a service is terminated, thereby reducing TCP connection stability.

SUMMARY

The present invention provides an apparatus, a system, and a method for preventing TCP connection interruption, so as to avoid service interruption caused by handover of user equipment.

A first aspect of the present invention provides an apparatus for preventing TCP connection interruption, including:

a processing module, configured to determine that user equipment UE needs cell handover; and a transceiver module, configured to: send a first instruction message to a server, where the first instruction message is used to instruct the server to stop sending downlink data to the proxy device; and send cached downlink data to the UE.

With reference to the first aspect, in a first feasible implementation manner, the transceiver module is further configured to: if it is acknowledged that all the cached downlink data is sent, instruct the server to continue sending the downlink data.

With reference to the first feasible implementation manner of the first aspect, in a second feasible implementation manner, the transceiver module is configured to:

receive a first acknowledgment message sent by the UE, where the first acknowledgment message is used to indicate that the last packet in the cached downlink data is successfully received by the UE; and send a second acknowledgment message to the server, where the second acknowledgment message is used to instruct the server to continue sending the downlink data to the transceiver module.

With reference to the first aspect, in a third feasible implementation manner, the transceiver module is further configured to:

send a second instruction message to the UE, where the second instruction message is used to instruct the UE to stop sending uplink data to the proxy device; and send cached uplink data to the server.

With reference to the third feasible implementation manner of the first aspect, in a fourth feasible implementation manner, the transceiver module is further configured to: if it is acknowledged that all the cached uplink data is sent, instruct the UE to continue sending the uplink data.

With reference to the fourth feasible implementation manner of the first aspect, in a fifth feasible implementation manner, the transceiver module is further configured to:

receive a third acknowledgment message sent by the server, where the third acknowledgment message is used to indicate that the last packet in the cached uplink data is successfully received by the server; and send a fourth acknowledgment message to the UE, where the fourth acknowledgment message is used to instruct the UE to continue sending the uplink data to the transceiver module.

With reference to any one of the first aspect, or feasible implementation manners of the first aspect, in a sixth feasible implementation manner, the processing module is configured to:

if it is detected that channel fading between the UE and a wireless access device in a source cell reaches a threshold range, determine that the UE needs cell handover.

With reference to the seventh feasible implementation manner of the first aspect, in a sixth feasible implementation manner, the processing module is further configured to:

after the transceiver module sends the cached downlink data to the UE, or after the transceiver module sends the cached uplink data to the server, if channel fading between the UE and the wireless access device in the source cell still falls within the threshold range, stop providing a proxy service for the UE.

A second aspect of the present invention provides an apparatus for preventing TCP connection interruption, including:

a processing module, configured to determine that user equipment UE needs cell handover; and a transceiver module, configured to: send a second instruction message to the UE, where the second instruction message is used to instruct the UE to stop sending uplink data to the proxy device; and send cached uplink data to a server.

With reference to the second aspect, in a first feasible implementation manner, the transceiver module is configured to: if it is acknowledged that all the cached uplink data is sent, instruct the UE to continue sending the uplink data.

With reference to the first feasible implementation manner of the second aspect, in a second feasible implementation manner, the transceiver module is configured to:

receive a third acknowledgment message sent by the server, where the third acknowledgment message is used to indicate that the last packet in the cached uplink data is successfully received by the server; and send a fourth acknowledgment message to the UE, where the fourth acknowledgment message is used to instruct the UE to continue sending the uplink data to the transceiver module.

With reference to any one of the second aspect, or feasible implementation manners of the second aspect, in a third feasible implementation manner, the processing module is configured to: if it is detected that channel fading between the UE and a wireless access device in a source cell reaches a threshold range, determine that the UE needs cell handover.

With reference to any one of the second aspect, or feasible implementation manners of the second aspect, in a fourth feasible implementation manner, the processing module is further configured to:

after the transceiver module sends the cached uplink data to the server, if channel fading between the UE and the wireless access device in the source cell still falls within the threshold range, stop providing a proxy service for the UE.

A third aspect of the present invention provides an apparatus for preventing TCP connection interruption, including:

a processing module, configured to determine that user equipment UE needs cell handover; and a transceiver module, configured to: send cached downlink data to the UE; receive a first acknowledgment message sent by the UE, where the first acknowledgment message is used to indicate that the last packet in the cached downlink data is successfully received by the UE; and send a second acknowledgment message to a server, where the second acknowledgment message is used to instruct the server to continue sending the downlink data to the proxy device.

With reference to the third aspect, in a first feasible implementation manner, the transceiver module is further configured to:

send cached uplink data to the server;

receive a third acknowledgment message sent by the server, where the third acknowledgment message is used to indicate that the last packet in the cached uplink data is successfully received by the server; and send a fourth acknowledgment message to the UE, where the fourth acknowledgment message is used to instruct the UE to continue sending the uplink data to the proxy device.

With reference to the third aspect or the first feasible implementation manner of the third aspect, in a second feasible implementation manner, the processing module is configured to: if it is detected that channel fading between the UE and a wireless access device in a source cell reaches a threshold range, determine that cell handover is about to be performed for the UE.

With reference to any one of the third aspect, or feasible implementation manners of the third aspect, in a third feasible implementation manner, the processing module is further configured to:

after the transceiver module sends the cached downlink data to the UE, or after the transceiver module sends the cached uplink data to the server, if channel fading between the UE and the wireless access device in the source cell still falls within the threshold range, stop providing a proxy service for the UE.

A fourth aspect of the present invention provides an apparatus for preventing TCP connection interruption, including:

a processing module, configured to determine that user equipment UE needs cell handover; and a transceiver module, configured to: send cached uplink data to a server; receive a third acknowledgment message sent by the server, where the third acknowledgment message is used to indicate that the last packet in the cached uplink data is successfully received by the server; and send a fourth acknowledgment message to the UE, where the fourth acknowledgment message is used to instruct the UE to continue sending the uplink data to the transceiver module.

With reference to the fourth aspect, in a first feasible implementation manner, the processing module is configured to: if it is detected that channel fading between the UE and a wireless access device in a source cell reaches a threshold range, determine that cell handover is about to be performed for the UE.

With reference to the fourth aspect or the first feasible implementation manner of the fourth aspect, in a second feasible implementation manner, the processing module is further configured to:

after the transceiver module sends the cached uplink data to the server, if channel fading between the UE and the wireless access device in the source cell still falls within the threshold range, stop providing a proxy service for the UE.

A fifth aspect of the present invention provides an apparatus for preventing TCP connection interruption, including:

a processing module, configured to: after user equipment UE is reconnected to a target cell, obtain downlink data cached by a proxy device in a source cell, where a receiver of the cached downlink data is the UE; and a transceiver module, configured to send the cached downlink data to the UE.

With reference to the fifth aspect, in a first feasible implementation manner, the transceiver module is further configured to receive the cached downlink data and an identifier of the UE that are sent by the proxy device in the source cell; or the processing module is configured to instruct the transceiver module to send a request message to the proxy device in the source cell, where the request message includes an identifier of the UE; and the transceiver module is further configured to receive the cached downlink data sent by the proxy device in the source cell.

With reference to the first feasible implementation manner of the fifth aspect, in a second feasible implementation manner, the transceiver module is configured to send the request message to the proxy device in the source cell according to an identifier of the source cell.

With reference to the first feasible implementation manner of the fifth aspect, in a third feasible implementation manner, the transceiver module is configured to receive, according to an identifier of the source cell, the cached downlink data and the identifier of the UE that are sent by the proxy device in the source cell.

With reference to any one of the fifth aspect, or feasible implementation manners of the fifth aspect, in a fourth feasible implementation manner, the transceiver module is further configured to:

after the UE is reconnected to the target cell, obtain uplink data cached by the proxy device in the source cell, where a receiver of the cached uplink data is a server; and send the cached uplink data to the server.

With reference to the fourth feasible implementation manner of the fifth aspect, in a fifth feasible implementation manner, the transceiver module is further configured to obtain the uplink data cached by the proxy device in the source cell, where the receiver of the cached uplink data is the server.

With reference to the fifth feasible implementation manner of the fifth aspect, in a sixth feasible implementation manner, the transceiver module is configured to:

receive the cached downlink data and the identifier of the UE that are sent by the proxy device in the source cell; or send a request message to the proxy device in the source cell, where the request message includes the identifier of the UE; and receive the cached downlink data sent by the proxy device in the source cell.

A sixth aspect of the present invention provides an apparatus for preventing TCP connection interruption, including:

a processing module, configured to: after user equipment UE is reconnected to a target cell, obtain uplink data cached by a proxy device in a source cell, where a receiver of the cached uplink data is a server; and a transceiver module, configured to send the cached uplink data to the server.

With reference to the sixth aspect, in a first feasible implementation manner, the transceiver module is further configured to receive the cached uplink data and an identifier of the UE that are sent by the proxy device in the source cell; or the processing module is configured to instruct the transceiver module to send a request message to the proxy device in the source cell, where the request message includes an identifier of the UE; and the transceiver module is further configured to receive the cached uplink data sent by the proxy device in the source cell.

With reference to the first feasible implementation manner of the sixth aspect, in a second feasible implementation manner, the transceiver module is configured to send the request message to the proxy device in the source cell according to an identifier of the source cell.

With reference to the first feasible implementation manner of the sixth aspect, in a third feasible implementation manner, the transceiver module is configured to receive, according to an identifier of the source cell, the cached uplink data and the identifier of the UE that are sent by the proxy device in the source cell.

A seventh aspect of the present invention provides a system for preventing TCP connection interruption, including: at least one apparatus for preventing TCP connection interruption according to any one of the first aspect, or feasible implementation manners of the first aspect, at least one user equipment UE, and at least one server.

An eighth aspect of the present invention provides a system for preventing TCP connection interruption, including: at least one apparatus for preventing TCP connection interruption according to any one of the second aspect, or feasible implementation manners of the second aspect, at least one user equipment UE, and at least one server.

A ninth aspect of the present invention provides a system for preventing TCP connection interruption, including: at least one apparatus for preventing TCP connection interruption according to any one of the third aspect, or feasible implementation manners of the third aspect, at least one user equipment UE, and at least one server.

A tenth aspect of the present invention provides a system for preventing TCP connection interruption, including: at least one apparatus for preventing TCP connection interruption according to any one of the fourth aspect, or feasible implementation manners of the fourth aspect, at least one user equipment UE, and at least one server.

An eleventh aspect of the present invention provides a system for preventing TCP connection interruption, including: at least one apparatus for preventing TCP connection interruption according to any one of the fifth aspect, or feasible implementation manners of the fifth aspect, at least one user equipment UE, and at least one server.

A twelfth aspect of the present invention provides a system for preventing TCP connection interruption, including: at least one apparatus for preventing TCP connection interruption according to any one of the sixth aspect, or feasible implementation manners of the sixth aspect, at least one user equipment UE, and at least one server.

A thirteenth aspect of the present invention provides a method for preventing TCP connection interruption, including:

determining, by a proxy device, that user equipment UE needs cell handover;

sending, by the proxy device, a first instruction message to a server, where the first instruction message is used to instruct the server to stop sending downlink data to the proxy device; and sending, by the proxy device, cached downlink data to the UE.

With reference to the thirteenth aspect, in a first feasible implementation manner, the method further includes:

if the proxy device acknowledges that all the cached downlink data is sent, instructing, by the proxy device, the server to continue sending the downlink data.

With reference to the first feasible implementation manner of the thirteenth aspect, in a second feasible implementation manner, the instructing, by the proxy device, the server to continue sending the downlink data includes:

receiving, by the proxy device, a first acknowledgment message sent by the UE, where the first acknowledgment message is used to indicate that the last packet in the cached downlink data is successfully received by the UE; and sending, by the proxy device, a second acknowledgment message to the server, where the second acknowledgment message is used to instruct the server to continue sending the downlink data to the proxy device.

With reference to the thirteenth aspect, in a third feasible implementation manner, the method further includes: sending, by the proxy device, a second instruction message to the UE, where the second instruction message is used to instruct the UE to stop sending uplink data to the proxy device; and sending, by the proxy device, cached uplink data to the server.

With reference to the third feasible implementation manner of the thirteenth aspect, in a fourth feasible implementation manner, the method further includes:

if the proxy device acknowledges that all the cached uplink data is sent, instructing, by the proxy device, the UE to continue sending the uplink data.

With reference to the fourth feasible implementation manner of the thirteenth aspect, in a fifth feasible implementation manner, the instructing, by the proxy device, the UE to continue sending the uplink data includes:

receiving, by the proxy device, a third acknowledgment message sent by the server, where the third acknowledgment message is used to indicate that the last packet in the cached uplink data is successfully received by the server; and sending, by the proxy device, a fourth acknowledgment message to the UE, where the fourth acknowledgment message is used to instruct the UE to continue sending the uplink data to the proxy device.

With reference to anyone of the thirteenth aspect, or feasible implementation manners of the thirteenth aspect, in a sixth feasible implementation manner, the determining, by a proxy device, that user equipment UE needs cell handover includes:

if the proxy device detects that channel fading between the UE and a wireless access device in a source cell reaches a threshold range, determining, by the proxy device, that the UE needs cell handover.

With reference to the seventh feasible implementation manner of the thirteenth aspect, in a sixth feasible implementation manner, after the sending, by the proxy device, cached downlink data to the UE, or after the sending, by the proxy device, cached uplink data to the server, the method further includes:

if channel fading between the UE and the wireless access device in the source cell still falls within the threshold range, stopping, by the proxy device, providing a proxy service for the UE.

A fourteenth aspect of the present invention provides a method for preventing TCP connection interruption, including:

determining, by a proxy device, that user equipment UE needs cell handover;

sending, by the proxy device, a second instruction message to the UE, where the second instruction message is used to instruct the UE to stop sending uplink data to the proxy device; and sending, by the proxy device, cached uplink data to a server.

With reference to the fourteenth aspect, in a first feasible implementation manner, the method further includes:

if the proxy device acknowledges that all the cached uplink data is sent, instructing, by the proxy device, the UE to continue sending the uplink data.

With reference to the first feasible implementation manner of the fourteenth aspect, in a second feasible implementation manner, the instructing, by the proxy device, the UE to continue sending the uplink data includes:

receiving, by the proxy device, a third acknowledgment message sent by the server, where the third acknowledgment message is used to indicate that the last packet in the cached uplink data is successfully received by the server; and sending, by the proxy device, a fourth acknowledgment message to the UE, where the fourth acknowledgment message is used to instruct the UE to continue sending the uplink data to the proxy device.

With reference to any one of the fourteenth aspect, or feasible implementation manners of the fourteenth aspect, in a third feasible implementation manner, the determining, by a proxy device, that user equipment UE needs cell handover includes:

if the proxy device detects that channel fading between the UE and a wireless access device in a source cell reaches a threshold range, determining, by the proxy device, that the UE needs cell handover.

With reference to any one of the fourteenth aspect, or feasible implementation manners of the fourteenth aspect, in a fourth feasible implementation manner, after the sending, by the proxy device, cached uplink data to the server, the method further includes:

if channel fading between the UE and the wireless access device in the source cell still falls within the threshold range, stopping, by the proxy device, providing a proxy service for the UE.

A fifteenth aspect of the present invention provides a method for preventing TCP connection interruption, including:

determining, by a proxy device, that user equipment UE needs cell handover;

sending, by the proxy device, cached downlink data to the UE;

receiving, by the proxy device, a first acknowledgment message sent by the UE, where the first acknowledgment message is used to indicate that the last packet in the cached downlink data is successfully received by the UE; and sending, by the proxy device, a second acknowledgment message to a server, where the second acknowledgment message is used to instruct the server to continue sending the downlink data to the proxy device.

With reference to the fifteenth aspect, in a first feasible implementation manner, the method further includes:

sending, by the proxy device, cached uplink data to the server;

receiving, by the proxy device, a third acknowledgment message sent by the server, where the third acknowledgment message is used to indicate that the last packet in the cached uplink data is successfully received by the server; and sending, by the proxy device, a fourth acknowledgment message to the UE, where the fourth acknowledgment message is used to instruct the UE to continue sending the uplink data to the proxy device.

With reference to the fifteenth aspect or the first feasible implementation manner of the fifteenth aspect, in a second feasible implementation manner, the determining, by a proxy device, that user equipment UE needs cell handover includes:

if the proxy device detects that channel fading between the UE and a wireless access device in a source cell reaches a threshold range, determining, by the proxy device, that cell handover is about to be performed for the UE.

With reference to any one of the fifteenth aspect, or feasible implementation manners of the fifteenth aspect, in a third feasible implementation manner, after the sending, by the proxy device, cached downlink data to the UE, or after the sending, by the proxy device, cached uplink data to the server, the method further includes:

if channel fading between the UE and the wireless access device in the source cell still falls within the threshold range, stopping, by the proxy device, providing a proxy service for the UE.

A sixteenth aspect of the present invention provides a method for preventing TCP connection interruption, including:

determining, by a proxy device, that user equipment UE needs cell handover;

sending, by the proxy device, cached uplink data to a server;

receiving, by the proxy device, a third acknowledgment message sent by the server, where the third acknowledgment message is used to indicate that the last packet in the cached uplink data is successfully received by the server; and sending, by the proxy device, a fourth acknowledgment message to the UE, where the fourth acknowledgment message is used to instruct the UE to continue sending the uplink data to the transceiver module.

With reference to the sixteenth aspect, in a first feasible implementation manner, the determining, by a proxy device, that user equipment UE needs cell handover includes:

if the proxy device detects that channel fading between the UE and a wireless access device in a source cell reaches a threshold range, determining, by the proxy device, that cell handover is about to be performed for the UE.

With reference to the sixteenth aspect or the first feasible implementation manner of the sixteenth aspect, in a second feasible implementation manner, after the sending, by the proxy device, cached data to the UE, the method further includes:

if channel fading between the UE and the wireless access device in the source cell still falls within the threshold range, stopping, by the proxy device, providing a proxy service for the UE.

A seventeenth aspect of the present invention provides a method for preventing TCP connection interruption, including:

after user equipment UE is reconnected to a target cell, obtaining downlink data cached by a proxy device in a source cell, where a receiver of the cached downlink data is the UE; and sending the cached downlink data to the UE.

With reference to the seventeenth aspect, in a first feasible implementation manner, the obtaining downlink data cached by a proxy device in a source cell includes:

receiving the cached downlink data and an identifier of the UE that are sent by the proxy device in the source cell; or sending a request message to the proxy device in the source cell, where the request message includes an identifier of the UE; and receiving the cached downlink data sent by the proxy device in the source cell.

With reference to the first feasible implementation manner of the seventeenth aspect, in a second feasible implementation manner, the sending a request message to the proxy device in the source cell includes:

sending the request message to the proxy device in the source cell according to an identifier of the source cell.

With reference to the first feasible implementation manner of the seventeenth aspect, in a third feasible implementation manner, the receiving the cached downlink data and an identifier of the UE that are sent by the proxy device in the source cell includes:

receiving, according to an identifier of the source cell, the cached downlink data and the identifier of the UE that are sent by the proxy device in the source cell.

With reference to any one of the seventeenth aspect, or feasible implementation manners of the seventeenth aspect, in a fourth feasible implementation manner, the method further includes:

after the UE is reconnected to the target cell, obtaining uplink data cached by the proxy device in the source cell, where a receiver of the cached uplink data is a server; and sending the cached uplink data to the server.

With reference to the fourth feasible implementation manner of the seventeenth aspect, in a fifth feasible implementation manner, the method further includes:

obtaining the uplink data cached by the proxy device in the source cell, where the receiver of the cached uplink data is the server.

With reference to the fifth feasible implementation manner of the seventeenth aspect, in a sixth feasible implementation manner, the obtaining uplink data cached by the proxy device in the source cell includes:

receiving the cached downlink data and the identifier of the UE that are sent by the proxy device in the source cell; or sending a request message to the proxy device in the source cell, where the request message includes the identifier of the UE; and receiving the cached downlink data sent by the proxy device in the source cell.

An eighteenth aspect of the present invention provides a method for preventing TCP connection interruption, including:

after user equipment UE is reconnected to a target cell, obtaining uplink data cached by a proxy device in a source cell, where a receiver of the cached uplink data is a server; and sending the cached uplink data to the server.

With reference to the eighteenth aspect, in a first feasible implementation manner, the obtaining uplink data cached by a proxy device in a source cell includes:

receiving the cached uplink data and an identifier of the UE that are sent by the proxy device in the source cell; or sending a request message to the proxy device in the source cell, where the request message includes an identifier of the UE; and receiving the cached uplink data sent by the proxy device in the source cell.

With reference to the first feasible implementation manner of the eighteenth aspect, in a second feasible implementation manner, the sending a request message to the proxy device in the source cell includes:

sending the request message to the proxy device in the source cell according to an identifier of the source cell.

With reference to the first feasible implementation manner of the eighteenth aspect, in a third feasible implementation manner, the receiving the cached uplink data and an identifier of the UE that are sent by the proxy device in the source cell includes:

receiving, according to an identifier of the source cell, the cached uplink data and the identifier of the UE that are sent by the proxy device in the source cell.

According to the apparatus, the system, and the method for preventing TCP connection interruption that are provided in the embodiments of the present invention, the apparatus determines that user equipment UE needs cell handover; and the apparatus sends a first instruction message to a server, where the first instruction message is used to instruct the server to stop sending downlink data to the proxy device, and sends cached downlink data to the UE. Therefore, the following problem is avoided: After UE is disconnected from a source cell and is connected to a new cell, because the UE does not receive partial downlink data cached by a TCP proxy or because partial cached data is lost, the UE initiates retransmission to a server, but the server does not retransmit an acknowledged packet according to a TCP protocol, causing TCP connection interruption and service interruption.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive another drawing from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
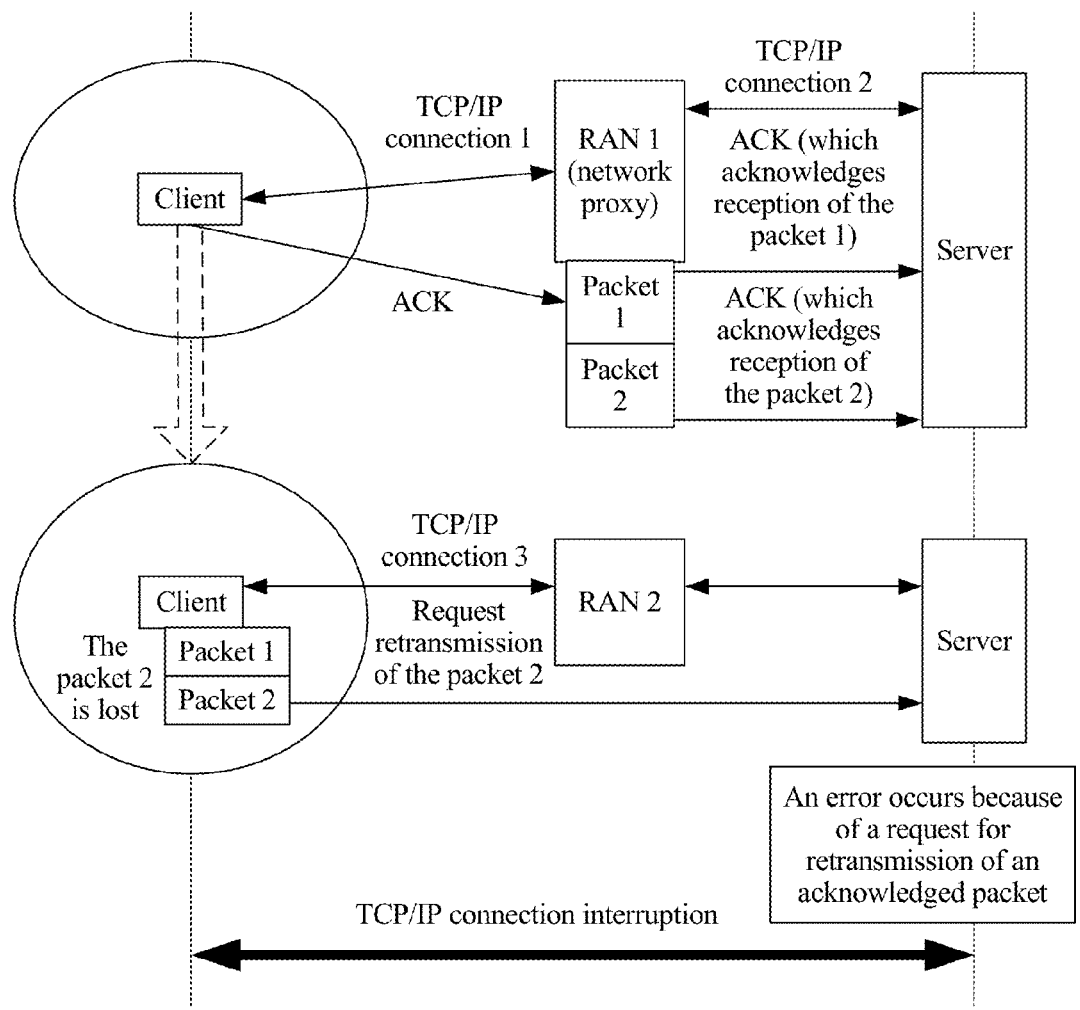
FIG. 1 is a schematic diagram of TCP connection interruption according to the prior art.

FIG. 1 is a schematic diagram of TCP connection interruption according to the prior art. Referring to FIG. 1, in a source network, data is transmitted between a client and a server (Server) by using a network proxy (Network Proxy). When a data transmission rate between the server and the network proxy is greater than a data transmission rate between the network proxy and user equipment (User Equipment, UE for short), or when a data transmission rate between the network proxy and user equipment UE is greater than a data transmission rate between the server and the network proxy, partial data is cached into the network proxy within a time period. In a communication process, the network proxy usually caches partial data sent by the server to the UE or caches partial data sent by the UE to the server, and the network proxy has sent, in place of the UE, an acknowledgment to the server. As shown in FIG. 1, downlink data is used as an example. Both a packet 1 and a packet 2 are downlink data sent by the server to the UE. After receiving the packet 1 and the packet 2, the network proxy caches the packet 1 and the packet 2 into the network proxy, and sends acknowledgments to the server by using a TCP/IP connection 2.

When the UE moves from one radio access network (Radio Access Network, RAN for short) to another RAN, for example, in FIG. 1, the UE moves from a RAN 1 to a RAN 2, because the UE is not handed over in a timely manner for some reasons, the UE needs to perform reconnection by using the RAN 2. After the UE is disconnected from the RAN 1 and is reconnected to the RAN 2, the packet 2 cached by a proxy device enabled in the RAN 1 is not sent to the UE in a timely manner. After finding that the packet 2 is lost, the UE requests the server to retransmit the packet 2. However, the proxy device in the RAN 1 has sent, to the server, an acknowledgment that the packet 2 is received. From the perspective of the server, the UE requests retransmission of the packet 2 after acknowledging the reception of the packet 2, and in this case, the server cannot retransmit the packet 2 according to a TCP protocol. Because the UE keeps receiving no packet 2, the UE repeatedly requests retransmission of the packet 2. Consequently, a TCP/IP connection between the UE and the server is interrupted, and a service is terminated.

To resolve the foregoing problem, the following embodiments of the present invention provide a method, an apparatus, and a system for preventing TCP connection interruption. The method, the apparatus, and the system for preventing TCP connection interruption may be applied to an LTE network, or may be applied to another communications network such as a Universal Mobile Telecommunications System (UMTS), a Global System for Mobile Communications (GSM), or Worldwide Interoperability for Microwave Access (WiMax). In addition, the apparatus for preventing TCP connection interruption can be placed in a UMTS Terrestrial Radio Access Network (UTRAN), an evolved universal terrestrial radio access network (E-UTRAN), a radio network controller (RNC), a serving gateway (S-GW), a serving GPRS support node (SGSN), a packet data network gateway (P-GW), or the like, so as to implement a proxy function. With reference to specific embodiments, the following describes the method, the apparatus, and the system for preventing TCP connection interruption.

Figure 2:
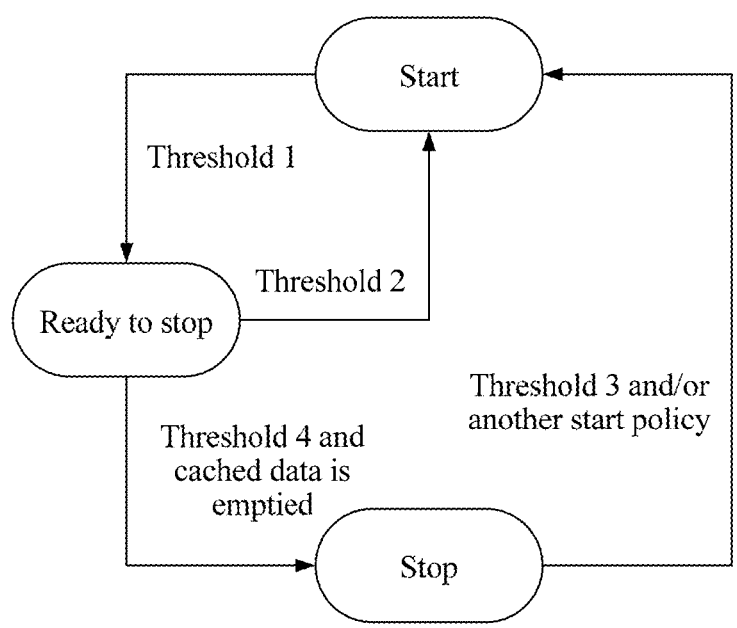
FIG. 2 is a schematic diagram of a state machine of an apparatus for preventing TCP connection interruption according to an embodiment of the present invention.

FIG. 2 is a schematic diagram of a state machine of an apparatus for preventing TCP connection interruption according to an embodiment of the present invention. Referring to FIG. 2, the apparatus for preventing TCP connection interruption is used as a proxy device. The proxy device has three states: a "start" state, a "ready to stop" state, and a "stop" state.

In the "start" state, the proxy device normally provides a proxy service for two TCP connections between a client and a server (a TCP connection between UE and the proxy device and a TCP connection between the proxy device and the server); and the proxy device caches and forwards data sent by a transmit end, and acknowledges received data by using the TCP connection.

In the "ready to stop" state, the proxy device stops receiving data sent by the transmit end, and continues forwarding, to a receive end, data cached by the TCP proxy.

In the "stop" state, the proxy device stops providing the proxy service, and data is transparently transmitted through the network proxy.

When the proxy device is in the "start" state, the proxy device is configured to provide the proxy service for TCP connections between the server and the UE. If it is detected that a specified switching policy of switching from the "start" state to the "ready to stop" state is met (an example that a "threshold 1" is detected is used in the present invention), the proxy device is switched from the "start" state to the "ready to stop" state.

When the proxy device is in the "ready to stop" state, the proxy device determines that cell handover is about to be performed for the UE. In this case, the proxy device empties data in a cache, that is, the proxy device sends cached downlink data to the UE, or sends cached uplink data to the server. If it is detected that a specified switching policy of switching from the "ready to stop" state to the "start" state is met (an example that a "threshold 2" is detected is used in the present invention), the proxy device is switched from the "ready to stop" state to the "start" state.

When the proxy device is in the "ready to stop" state, if it is detected that a specified switching policy of switching from the "ready to stop" state to the "stop" state is met (an example that a "threshold 4" and "data cached by the proxy device is emptied" are detected is used in the present invention), the proxy device is switched from the "ready to stop" state to the "stop" state.

When the proxy device is in the "stop" state, if it is detected that a specified switching policy of switching from the "stop" state to the "start" state is met (an example that a "threshold 3 or another start policy or both" is detected is used in the present invention), the proxy device is switched from the "stop" state to the "start" state.

Specifically, for how the proxy device is switched from the "stop" state to the "start" state, a state switching trigger policy includes but is not limited to a rule specified by a network operator to optimize network transmission. For example, the TCP proxy enters the "start" state if the TCP proxy enters a slow start stage, and the TCP proxy enters the "stop" state in another stage; or the TCP proxy enters the "start" state when a transmission rate falls within a threshold range, and the TCP proxy is switched to the "stop" state when the transmission rate does not fall within the threshold range.

A conventional TCP proxy technology is implemented as follows: A network proxy starts when a client initially establishes a TCP/IP connection. For example, an IP address used by the client is modified by the network proxy, and a modified IP address is sent to a server. In this process, there are two TCP/IP connections between the client and the server. Because a device in a wired communications network is fixed, or is basically fixed and rarely moves, this proxy technology has no problem in the wired communications network. However, due to mobility of a device in a wireless communications network, when state switching is performed for a network element that performs a network proxy function, a current TCP/IP connection is terminated, and a new TCP/IP connection needs to be established manually. Consequently, service experience of a user is greatly affected.

Figure 3A:
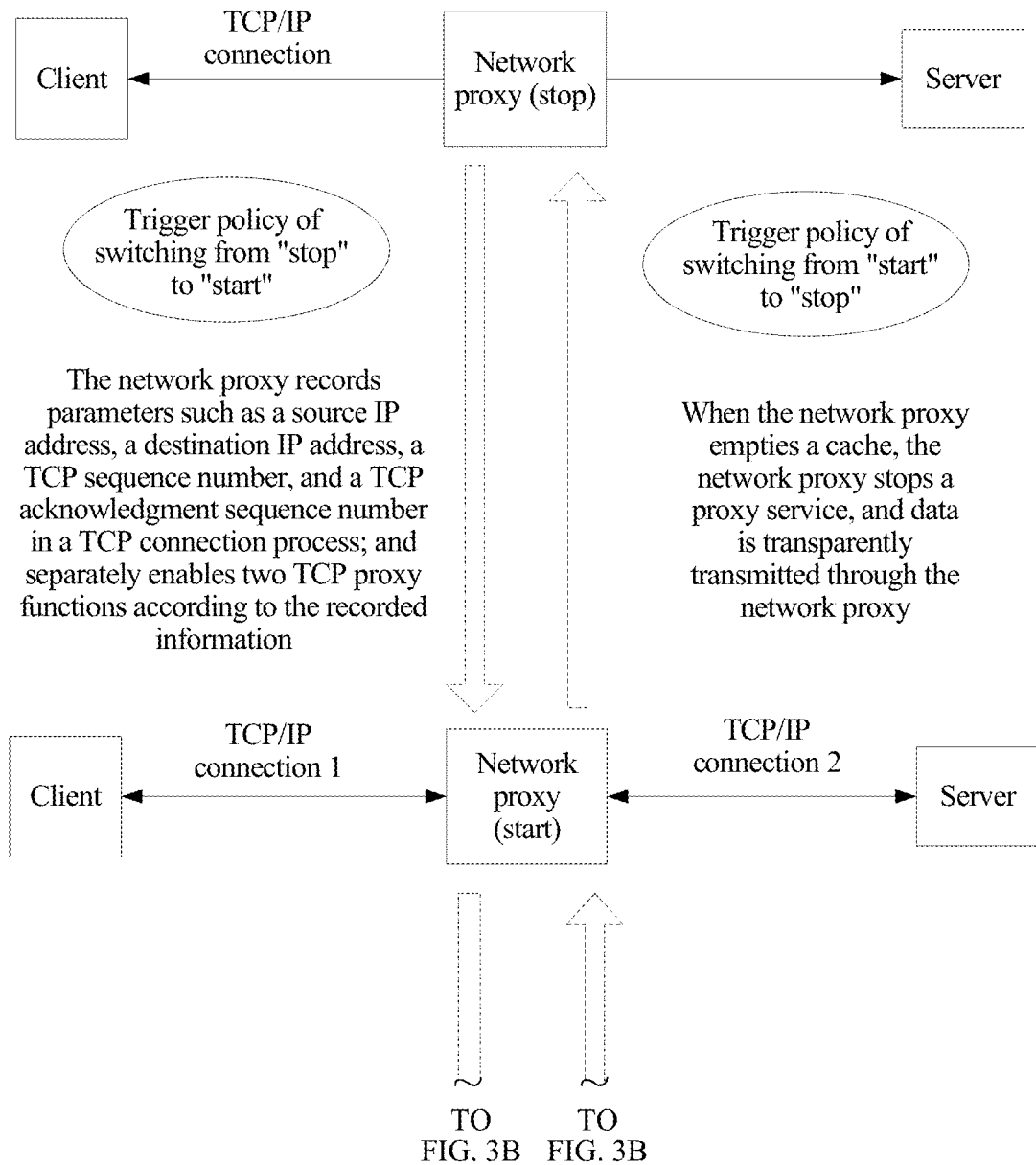
FIG. 3A and FIG. 3B are a schematic flowchart of a method for preventing TCP connection interruption according to an embodiment of the present invention.
Figure 3B:
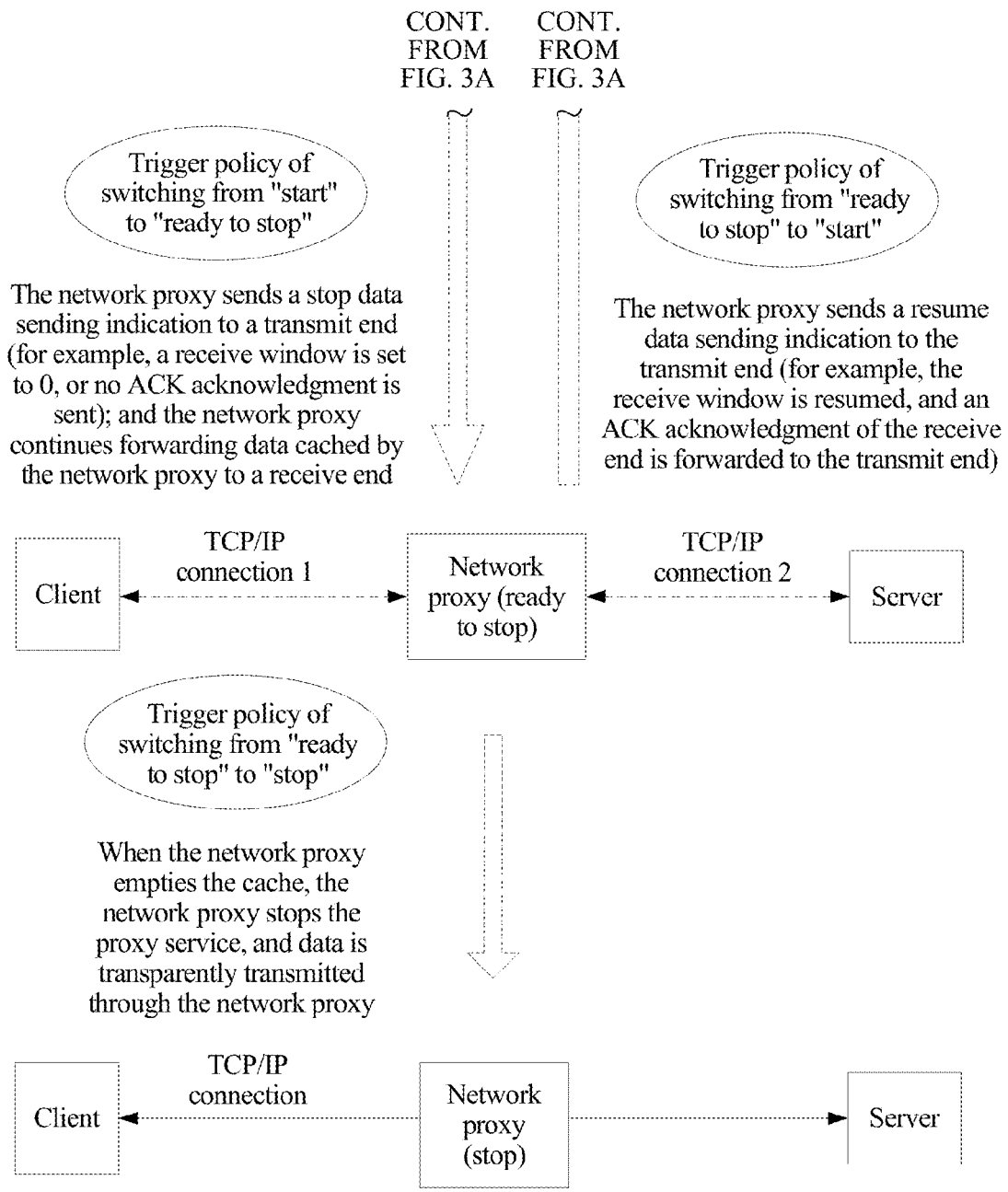

After the three states are introduced to the proxy device, the proxy device can be effectively used to avoid the disadvantage of the conventional TCP proxy technology. The following uses a specific embodiment for description. FIG. 3A and FIG. 3B are a schematic flowchart of a method for preventing TCP connection interruption according to an embodiment of the present invention. Referring to FIG. 3A and FIG. 3B, When a proxy device used as a network proxy is in a "stop" state, the proxy device may be switched from the "stop" state to a "start" state. Specifically, the network proxy records parameters such as a source IP address, a destination IP address, a TCP sequence number, and a TCP acknowledgment sequence number in a TCP connection process; and separately enables two TCP proxy functions (that is, a TCP/IP connection 1 and a TCP/IP connection 2 in the diagram) according to the recorded information.

A method in which the network proxy enables the two TCP proxy functions includes: keeping, in place of a server, a TCP connection to UE [that is, sending, in place of the server, downlink data to the UE, or receiving, in place of the server, uplink data from the UE; and keeping an IP address of the server, a TCP port number, and a TCP sequence number and a TCP acknowledgment sequence number of the server], where the TCP connection is referred to as the TCP/IP connection 1; and keeping, in place of the UE, a TCP connection to the server (that is, sending, in place of the UE, uplink data to the server, or receiving, in place of the UE, downlink data sent by the server to the UE; and keeping an IP address of the UE, a TCP port number, and a TCP sequence number and a TCP acknowledgment sequence number of the UE), where the TCP connection is referred to as the TCP/IP connection 2. This operation process is transparent for both the UE and the server.

When the network proxy is in the "start" state, the network proxy may be switched to the "stop" state, or may be switched to a "ready to stop" state. During a switchover to the "stop" state, the network proxy empties a cache, the network proxy stops providing a proxy service, and data is transparently transmitted through the network proxy.

When the network proxy is switched from the "start" state to the "ready to stop" state, the network proxy sends a stop data sending instruction to a transmit end of data. For example, a receive window is set to "0", or no acknowledgment (ACK) message is sent. In addition, the network proxy continues forwarding data cached by the network proxy to a receive end of data.

When the network proxy is in the "ready to stop" state, the network proxy may be switched to the "start" state, or may be switched to the "stop" state. During a switchover to the "start" state, the network proxy sends a resume data sending instruction to the transmit end. For example, the receive window is resumed, or an acknowledgment message of the receive end is forwarded to the transmit end.

When the network proxy is switched to the "stop" state and when the network proxy empties the cache, the network proxy stops the proxy service, and data is transparently transmitted through the network proxy.

Figure 4:
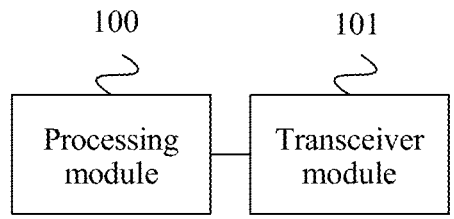
FIG. 4 is a schematic structural diagram of an apparatus for preventing TCP connection interruption according to an embodiment of the present invention.

FIG. 4 is a schematic structural diagram of an apparatus for preventing TCP connection interruption according to an embodiment of the present invention. The apparatus is used as a proxy device that may perform corresponding functions of the network proxy. Referring to FIG. 4, the apparatus includes a processing module 100 and a transceiver module 101.

The processing module 100 is configured to determine that user equipment UE needs cell handover.

The transceiver module 101 is configured to: send a first instruction message to a server, where the first instruction message is used to instruct the server to stop sending downlink data to the proxy device; and send cached downlink data to the UE.

According to the apparatus for preventing TCP connection interruption provided in this embodiment of the present invention, a processing module determines that user equipment UE needs cell handover; and a transceiver module sends a first instruction message to a server, where the first instruction message is used to instruct the server to stop sending downlink data to the proxy device, and sends cached downlink data to the UE. Therefore, the following problem is avoided: After UE is disconnected from a source cell and is connected to a new cell, because the UE does not receive partial downlink data cached by a TCP proxy or because partial cached data is lost, the UE initiates retransmission to a server, but the server does not retransmit an acknowledged packet according to a TCP protocol, causing TCP connection interruption and service interruption.

Optionally, the transceiver module 101 is further configured to: if it is acknowledged that all the cached downlink data is sent, instruct the server to continue sending the downlink data.

Further, the transceiver module 101 is configured to:
receive a first acknowledgment message sent by the UE, where the first acknowledgment message is used to indicate that the last packet in the cached downlink data is successfully received by the UE; and
send a second acknowledgment message to the server, where the second acknowledgment message is used to indicate that the UE successfully receives the last packet in the cached downlink data.

Optionally, the transceiver module 101 is further configured to:
send a second instruction message to the UE, where the second instruction message is used to instruct the UE to stop sending uplink data to the proxy device; and send cached uplink data to the server.

Further, the transceiver module 101 is further configured to: if it is acknowledged that all the cached uplink data is sent, instruct the UE to continue sending the uplink data.

Further, the transceiver module 101 is further configured to:
receive a third acknowledgment message sent by the server, where the third acknowledgment message is used to indicate that the last packet in the cached uplink data is successfully received by the server; and
send a fourth acknowledgment message to the UE, where the fourth acknowledgment message is used to instruct the UE to continue sending the uplink data to the transceiver module.

Specifically, the fourth acknowledgment message indicates that the server successfully receives the last packet in the cached uplink data. When receiving the fourth acknowledgment message, the UE considers that the UE may continue sending the uplink data to the transceiver module.

Optionally, the processing module 100 is configured to:
if it is detected that channel fading between the UE and a wireless access device in a source cell reaches a threshold range, determine that the UE needs cell handover.

Further, the processing module 100 is further configured to:
after the transceiver module 101 sends the cached downlink data to the UE, or after the transceiver module 101 sends the cached uplink data to the server, if channel fading between the UE and the wireless access device in the source cell still falls within the threshold range, stop providing a proxy service for the UE.

Still referring to FIG. 4, the apparatus can further implement the following functions:

A processing module 100 is configured to determine that user equipment UE needs cell handover.

A transceiver module 101 is configured to: send a second instruction message to the UE, where the second instruction message is used to instruct the UE to stop sending uplink data to the proxy device; and send cached uplink data to a server.

According to the apparatus for preventing TCP connection interruption provided in this embodiment of the present invention, a processing module determines that user equipment UE needs cell handover; and a transceiver module sends a second instruction message to the UE, where the second instruction message is used to instruct the UE to stop sending uplink data to the proxy device; and sends cached uplink data to a server. Therefore, a case in which uplink data sent by UE is lost because the UE is handed over is avoided.

Preferably, the transceiver module 101 is configured to: if it is acknowledged that all the cached uplink data is sent, instruct the UE to continue sending the uplink data.

Further, the transceiver module 101 is configured to:
receive a third acknowledgment message sent by the server, where the third acknowledgment message is used to indicate that the last packet in the cached uplink data is successfully received by the server; and send a fourth acknowledgment message to the UE, where the fourth acknowledgment message is used to instruct the UE to continue sending the uplink data to the transceiver module.

Preferably, the processing module 100 is configured to: if it is detected that channel fading between the UE and a wireless access device in a source cell reaches a threshold range, determine that the UE needs cell handover.

Preferably, the processing module 100 is further configured to:

after the transceiver module sends the cached uplink data to the server, if channel fading between the UE and the wireless access device in the source cell still falls within the threshold range, stop providing a proxy service for the UE.

Still referring to FIG. 4, the apparatus may be further configured to implement the following functions:

A processing module 100 is configured to determine that user equipment UE needs cell handover.

A transceiver module 101 is configured to: send cached downlink data to the UE; receive a first acknowledgment message sent by the UE, where the first acknowledgment message is used to indicate that the last packet in the cached downlink data is successfully received by the UE; and send a second acknowledgment message to a server, where the second acknowledgment message is used to instruct the server to continue sending the downlink data to the proxy device.

According to the apparatus for preventing TCP connection interruption provided in this embodiment of the present invention, a processing module determines that user equipment UE needs cell handover; and a transceiver module sends cached downlink data to the UE; receives a first acknowledgment message sent by the UE, where the first acknowledgment message is used to indicate that the last packet in the cached downlink data is successfully received by the UE; and sends a second acknowledgment message to a server, where the second acknowledgment message is used to instruct the server to continue sending the downlink data to the proxy device. Therefore, the following problem is avoided: After UE is disconnected from a source cell and is connected to a new cell, because the UE does not receive partial downlink data cached by a TCP proxy or because partial cached data is lost, the UE initiates retransmission to a server, but the server does not retransmit an acknowledged packet according to a TCP protocol, causing TCP connection interruption and service interruption.

Further, the transceiver module 101 is further configured to:

send cached uplink data to the server;

receive a third acknowledgment message sent by the server, where the third acknowledgment message is used to indicate that the last packet in the cached uplink data is successfully received by the server; and send a fourth acknowledgment message to the UE, where the fourth acknowledgment message is used to instruct the UE to continue sending the uplink data to the proxy device.

Further, the processing module 100 is configured to: if it is detected that channel fading between the UE and a wireless access device in a source cell reaches a threshold range, determine that cell handover is about to be performed for the UE.

Optionally, the processing module 100 is further configured to:

after the transceiver module sends the cached downlink data to the UE, or after the transceiver module sends the cached uplink data to the server, if channel fading between the UE and the wireless access device in the source cell still falls within the threshold range, stop providing a proxy service for the UE.

Still referring to FIG. 4, the apparatus may be further configured to implement the following functions:

A processing module 100 is configured to determine that user equipment UE needs cell handover.

A transceiver module 101 is configured to: send cached uplink data to a server; receive a third acknowledgment message sent by the server, where the third acknowledgment message is used to indicate that the last packet in the cached uplink data is successfully received by the server; and send a fourth acknowledgment message to the UE, where the fourth acknowledgment message is used to instruct the UE to continue sending the uplink data to the transceiver module.

According to the apparatus for preventing TCP connection interruption provided in this embodiment of the present invention, a processing module determines that user equipment UE needs cell handover; and a transceiver module sends cached uplink data to a server; receives a third acknowledgment message sent by the server, where the third acknowledgment message is used to indicate that the last packet in the cached uplink data is successfully received by the server; and sends a fourth acknowledgment message to the UE, where the fourth acknowledgment message is used to instruct the UE to continue sending the uplink data to the transceiver module. Therefore, the following problem is avoided: After UE is disconnected from a source cell and is connected to a new cell, because a server does not receive partial uplink data cached by a TCP proxy or because partial cached data is lost, the server initiates retransmission to the UE, but the UE does not retransmit an acknowledged packet according to a TCP protocol, causing TCP connection interruption and service interruption.

Further, the processing module 100 is configured to: if it is detected that channel fading between the UE and a wireless access device in a source cell reaches a threshold range, determine that cell handover is about to be performed for the UE.

Further, the processing module 100 is further configured to:

after the transceiver module 101 sends the cached uplink data to the server, if channel fading between the UE and the wireless access device in the source cell still falls within the threshold range, stop providing a proxy service for the UE.

Still referring to FIG. 4, the apparatus may be further configured to implement the following functions:

A processing module 100 is configured to: after user equipment UE is reconnected to a target cell, obtain downlink data cached by a proxy device in a source cell, where a receiver of the cached downlink data is the UE.

A transceiver module 101 is configured to send the cached downlink data to the UE.

According to the apparatus for preventing TCP connection interruption provided in this embodiment of the present invention, after user equipment UE is reconnected to a target cell, a processing module obtains downlink data cached by a proxy device in a source cell, where a receiver of the cached downlink data is the UE; and a transceiver module sends the cached downlink data to the UE. Therefore, the downlink data cached by the proxy device is sent to the UE, no TCP connection interruption occurs, and communication stability is improved. Therefore, the following problem is avoided: After UE is handed over to a target cell, because the UE does not receive previous downlink data, the UE initiates a retransmission request to a server, but the server does not retransmit, according to a TCP protocol, data whose ACK acknowledgment has been received, causing TCP connection interruption.

Further, there are two feasible manners of obtaining the downlink data cached by the proxy device in the source cell. In a first manner, the transceiver module 101 is further configured to receive the cached downlink data and an identifier of the UE that are sent by the proxy device in the source cell.

In a second manner, the processing module 100 is configured to instruct the transceiver module 101 to send a request message to the proxy device in the source cell, where the request message includes an identifier of the UE; and the transceiver module 101 is further configured to receive the cached downlink data sent by the proxy device in the source cell.

Further, the transceiver module 101 is configured to send the request message to the proxy device in the source cell according to an identifier of the source cell.

Optionally, the transceiver module 101 is configured to receive, according to an identifier of the source cell, the cached downlink data and the identifier of the UE that are sent by the proxy device in the source cell.

Further, the transceiver module 101 is configured to: after the UE is reconnected to the target cell, obtain uplink data cached by the proxy device in the source cell, where a receiver of the cached uplink data is a server; and send the cached uplink data to the server.

Further, the transceiver module 101 is further configured to obtain the uplink data cached by the proxy device in the source cell, where the receiver of the cached uplink data is the server.

Further, the transceiver module 101 is configured to:

receive the cached downlink data and the identifier of the UE that are sent by the proxy device in the source cell; or send a request message to the proxy device in the source cell, where the request message includes the identifier of the UE; and receive the cached downlink data sent by the proxy device in the source cell.

Still referring to FIG. 4, the apparatus may be further configured to implement the following functions:

A processing module 100 is configured to: after user equipment UE is reconnected to a target cell, obtain uplink data cached by a proxy device in a source cell, where a receiver of the cached uplink data is a server.

A transceiver module 101 is configured to send the cached uplink data to the server.

According to the apparatus for preventing TCP connection interruption provided in this embodiment of the present invention, after user equipment UE is reconnected to a target cell, a processing module obtains uplink data cached by a proxy device in a source cell, where a receiver of the cached uplink data is a server; and a transceiver module sends the cached uplink data to the server. Therefore, the uplink data cached by the proxy device is sent to the server, no TCP connection interruption occurs, and communication stability is improved. Therefore, the following problem is avoided: After UE is handed over to a target cell, because a server does not receive previous uplink data, the server initiates a retransmission request to the UE, but the UE does not retransmit, according to a TCP protocol, data whose ACK acknowledgment has been received, causing TCP connection interruption.

Further, there are two feasible manners of obtaining the uplink data cached by the proxy device in the source cell. In a first manner, the transceiver module 101 is further configured to receive the cached uplink data and an identifier of the UE that are sent by the proxy device in the source cell.

In a second manner, the processing module 100 is configured to instruct the transceiver module to send a request message to the proxy device in the source cell, where the request message includes an identifier of the UE; and the transceiver module 101 is further configured to receive the cached uplink data sent by the proxy device in the source cell.

Further, the transceiver module 101 is configured to send the request message to the proxy device in the source cell according to an identifier of the source cell.

Optionally, the transceiver module 101 is configured to receive, according to an identifier of the source cell, the cached uplink data and the identifier of the UE that are sent by the proxy device in the source cell.

Figure 5:
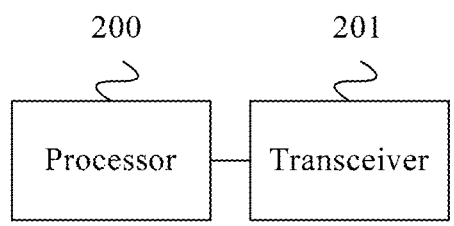
FIG. 5 is a schematic structural diagram of an apparatus for preventing TCP connection interruption according to an embodiment of the present invention.

FIG. 5 is a schematic structural diagram of an apparatus for preventing TCP connection interruption according to an embodiment of the present invention. The apparatus is used as a proxy device that may perform corresponding functions of the network proxy. Referring to FIG. 5, the apparatus includes a processor 200 and a transceiver 201.

The apparatus for preventing TCP connection interruption shown in FIG. 5 may have functions of the apparatus in the embodiments corresponding to FIG. 4. Specifically, the processor 200 may perform all functions of the processing module 100, and the transceiver 201 may perform all functions of the transceiver module 101.

Correspondingly, the apparatus shown in FIG. 5 may implement technical effects in the embodiments corresponding to FIG. 4.

Figure 6:
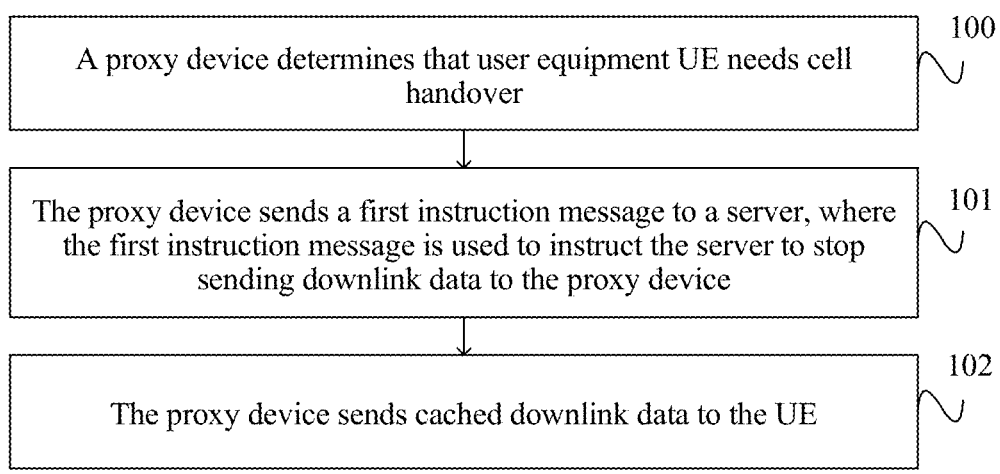
FIG. 6 is a schematic flowchart of a method for preventing TCP connection interruption according to an embodiment of the present invention.

FIG. 6 is a schematic flowchart of a method for preventing TCP connection interruption according to an embodiment of the present invention. In FIG. 6, an execution body is the apparatus for preventing TCP connection interruption. The apparatus for preventing TCP connection interruption is used as a proxy device. The proxy device may use the structure shown in FIG. 4 or FIG. 5, perform functions in a corresponding embodiment, and can implement a TCP proxy between a server and UE. Referring to FIG. 6, the method includes the following steps:

Step 100: A proxy device determines that user equipment UE needs cell handover.

Step 101: The proxy device sends a first instruction message to a server, where the first instruction message is used to instruct the server to stop sending downlink data to the proxy device.

Step 102: The proxy device sends cached downlink data to the UE.

It should be noted that, when a data transmission rate between the server and the proxy device is greater than a data transmission rate between the proxy device and the UE, partial downlink data is cached into the proxy device within a time period.

According to the method for preventing TCP connection interruption provided in this embodiment of the present invention, a proxy device determines that user equipment UE needs cell handover; the proxy device sends a first instruction message to a server, where the first instruction message is used to instruct the server to stop sending downlink data to the proxy device; and the proxy device sends cached downlink data to the UE. Therefore, the following problem is avoided: After UE is disconnected from a source cell and is connected to a new cell, because the UE does not receive partial downlink data cached by a TCP proxy or because partial cached data is lost, the UE initiates retransmission to a server, but the server does not retransmit an acknowledged packet according to a TCP protocol, causing TCP connection interruption and service interruption.

Further, one feasible implementation manner of step 101 that the proxy device sends a first instruction message to a server is as follows: The proxy device sends the first instruction message to the server, and the first instruction message indicates that a receive window is 0. Specifically, the first instruction message may be implemented as follows: The receive window is set to 0 and is carried in a window (window) field of a header field in a TCP acknowledgment message sent by the proxy device to the server. The TCP message may be an uplink packet or an ACK acknowledgment packet.

In a "ready to stop" state, that is, when the receive window of the proxy device in the present invention is 0, according to a TCP protocol, after the server receives the indication that the receive window is 0, the server does not continue sending downlink data.

Figure 7:
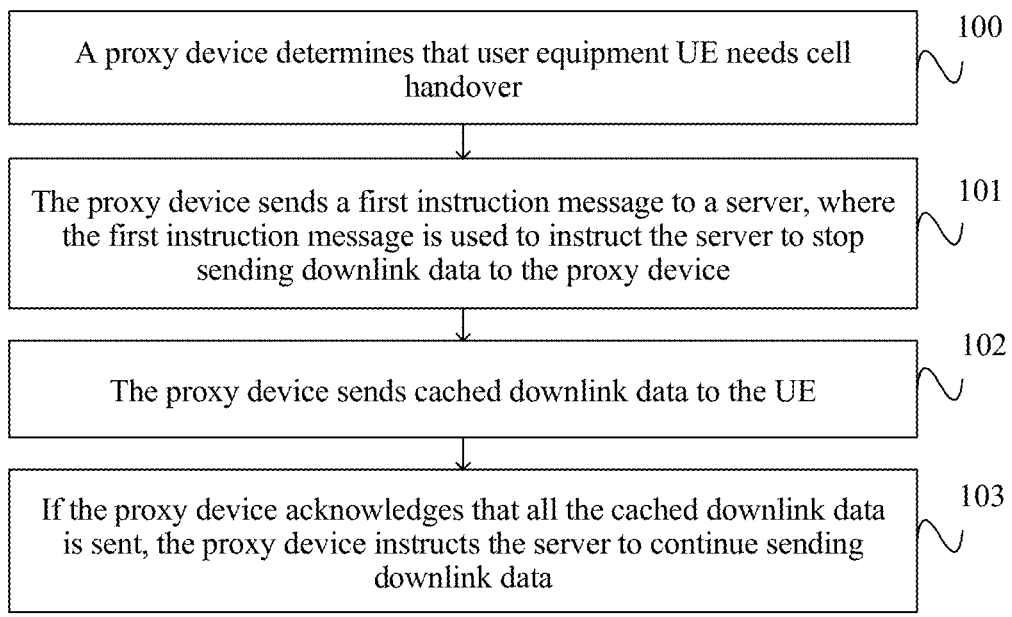
FIG. 7 is a schematic flowchart of another method for preventing TCP connection interruption according to an embodiment of the present invention.

Based on FIG. 6, FIG. 7 is a schematic flowchart of another method for preventing TCP connection interruption according to an embodiment of the present invention. Referring to FIG. 7, after step 102, the method further includes the following step:

Step 103: If the proxy device acknowledges that all the cached downlink data is sent, the proxy device instructs the server to continue sending the downlink data.

Specifically, when the proxy device acknowledges that the cached downlink data is emptied, if cell handover is performed for the UE, the UE has obtained all the cached downlink data required by the UE, so that a case in which the UE receives no cached data after completing handover does not occur.

Further, one feasible implementation manner of step 103 is as follows:

Step 103*a*: The proxy device receives a first acknowledgment message sent by the UE, where the first acknowledgment message is used to indicate that the last packet in the cached downlink data is successfully received by the UE.

Specifically, when the proxy device receives the first acknowledgment message sent by the UE, it indicates that the UE has successfully received all the cached downlink data, that is, the downlink data cached by the proxy device is emptied.

Step 103*b*: The proxy device sends a second acknowledgment message to the server, where the second acknowledgment message is used to instruct the server to continue sending the downlink data to the proxy device. The server may continue, according to the receive window in a window (window) field of a header field in a TCP acknowledgment message, sending downlink data. The second acknowledgment message and the first acknowledgment message may be a same message. That is, the second acknowledgment message is the first acknowledgment message that is sent by the UE and that is forwarded by the proxy device to the server.

Specifically, after the proxy device sends the cached downlink data to the UE, the UE sends an acknowledgment (ACK) message to the proxy device, so as to notify the proxy device that the UE successfully receives the cached downlink data. In this case, the proxy device in this solution does not send all acknowledgment messages to the server. Instead, after receiving an acknowledgment message corresponding to the last packet in the cached downlink packets, that is, after receiving the first acknowledgment message, the proxy device sends the second acknowledgment message to the server, so as to notify the server that the UE has successfully received the last packet in the cached downlink data. The server may continue, according to the receive window in the window (window) field of the header field in the TCP acknowledgment message, sending downlink data to the UE.

Figure 8:
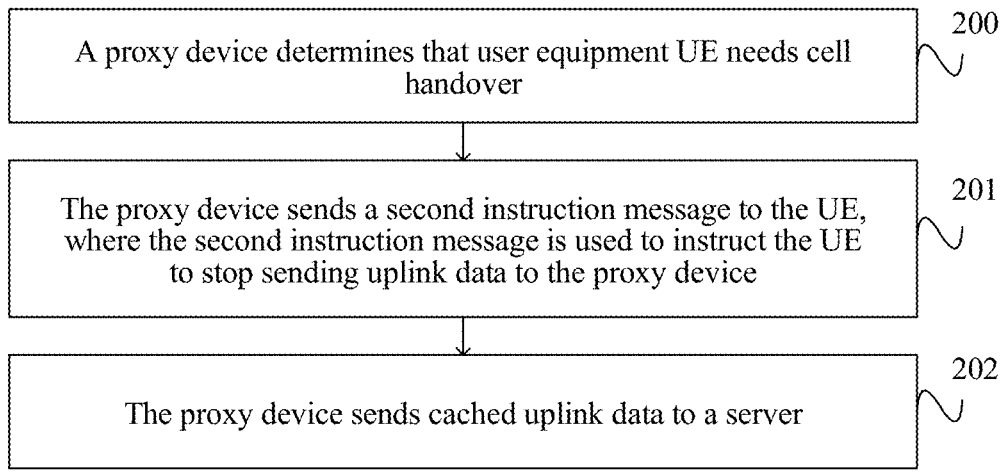
FIG. 8 is a schematic flowchart of another method for preventing TCP connection interruption according to an embodiment of the present invention.

Further, when the data transmission rate between the proxy device and the UE is greater than the data transmission rate between the server and the proxy device, partial uplink data is cached into the proxy device within a time period. Usually, the proxy device separately configures two caches that are respectively used to buffer uplink data and downlink data. A processing process in which the proxy device empties the cached downlink data (referring to step 100 to step 103) and a processing process in which the proxy device empties the cached uplink data may be independent from each other, or may be performed simultaneously. The following uses a specific embodiment to describe a solution for emptying the cached uplink data. FIG. 8 is a schematic flowchart of another method for preventing TCP connection interruption according to an embodiment of the present invention. The proxy device may use the structure shown in FIG. 4 or FIG. 5, and perform functions in a corresponding embodiment. Referring to FIG. 8, the method includes the following steps:

Step 200: A proxy device determines that user equipment UE needs cell handover.

Step 201: The proxy device sends a second instruction message to the UE, where the second instruction message is used to instruct the UE to stop sending uplink data to the proxy device.

Step 202: The proxy device sends cached uplink data to a server.

It should be noted that step 200 is totally the same as step 100, and it can be learned that step 201 and step 202 in this solution may be performed at the same time as the embodiment corresponding to FIG. 6 or FIG. 7. Step 201 and step 202 can be performed provided that the proxy device caches uplink data.

According to the method for preventing TCP connection interruption provided in this embodiment of the present invention, a proxy device determines that user equipment UE needs cell handover; the proxy device sends a second instruction message to the UE, where the second instruction message is used to instruct the UE to stop sending uplink data to the proxy device; and the proxy device sends cached uplink data to a server. Therefore, a case in which uplink data sent by UE is lost because the UE is handed over is avoided.

Further, a specific implementation manner of the second instruction message sent by the proxy device to the UE in step 201 is similar to that of the first instruction message, that is, the second instruction message is implemented by adding a receive window of 0. Details are not described herein again.

Figure 9:
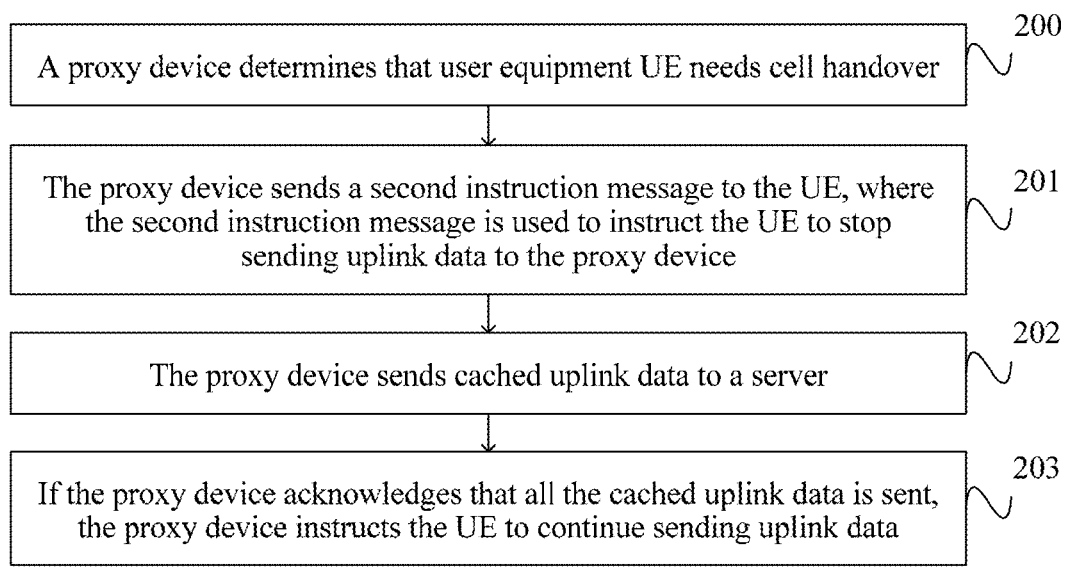
FIG. 9 is a schematic flowchart of another method for preventing TCP connection interruption according to an embodiment of the present invention.

Based on FIG. 8, FIG. 9 is a schematic flowchart of another method for preventing TCP connection interruption according to an embodiment of the present invention. Referring to FIG. 9, after step 202, the method further includes the following step:

Step 203: If the proxy device acknowledges that all the cached uplink data is sent, the proxy device instructs the UE to continue sending the uplink data.

Specifically, a purpose of step 203 is the same as that of step 103, that is, when cached data is emptied, the UE is instructed to continue sending uplink data. Therefore, TCP connection interruption is avoided in a process in which the UE is handed over.

Further, one feasible implementation manner of step 203 is as follows:

Step 203a: The proxy device receives a third acknowledgment message sent by the server, where the third acknowledgment message is used to indicate that the last packet in the cached uplink data is successfully received by the server.

Specifically, similar to step 103a, after the proxy device receives the third acknowledgment message, it indicates that the server has successfully received all the cached uplink data sent by the proxy device.

Step 203b: The proxy device sends a fourth acknowledgment message to the UE, where the fourth acknowledgment message is used to instruct the UE to continue sending the uplink data to the proxy device. The UE may continue, according to the receive window in a window (window) field of a header field in a TCP acknowledgment message, sending downlink data.

Preferably, in step 100 and step 200, for how to determine that cell handover is about to be performed for the UE, the following provides one feasible implementation manner:

If the proxy device detects that channel fading between the UE and a wireless access device in a source cell reaches a threshold range, the proxy device determines that the UE needs cell handover.

It should be noted that a representation manner of the threshold range may be a receive power, a transmission rate, or the like. That is, when the proxy device is in the "start" state, after it is determined that cell handover is about to be performed for the UE, the proxy device is switched to a "ready to stop" state.

Further, based on the foregoing description, the proxy device may send the cached downlink data to the UE and/or send the cached uplink data to the server. Therefore, based on different scenarios of sending cached data, after the cached data is emptied, the following processing further exists.

After the proxy device sends the cached downlink data to the UE, or after the proxy device sends the cached uplink data to the server, the method further includes:

if channel fading between the UE and the wireless access device in the source cell still falls within the threshold range, stopping, by the proxy device, providing a proxy service for the UE.

Specifically, after the proxy device is in the "ready to stop" state and empties the cached uplink data and/or the cached downlink data, if channel between the UE and the wireless access device in the source cell still falls within the threshold range, the proxy device stops providing the proxy service for the UE, that is, the proxy device is switched to a "stop" state.

The following uses an example that a proxy device caches downlink data, to describe the methods shown in FIG. 6 to FIG. 9.

Figure 10A:
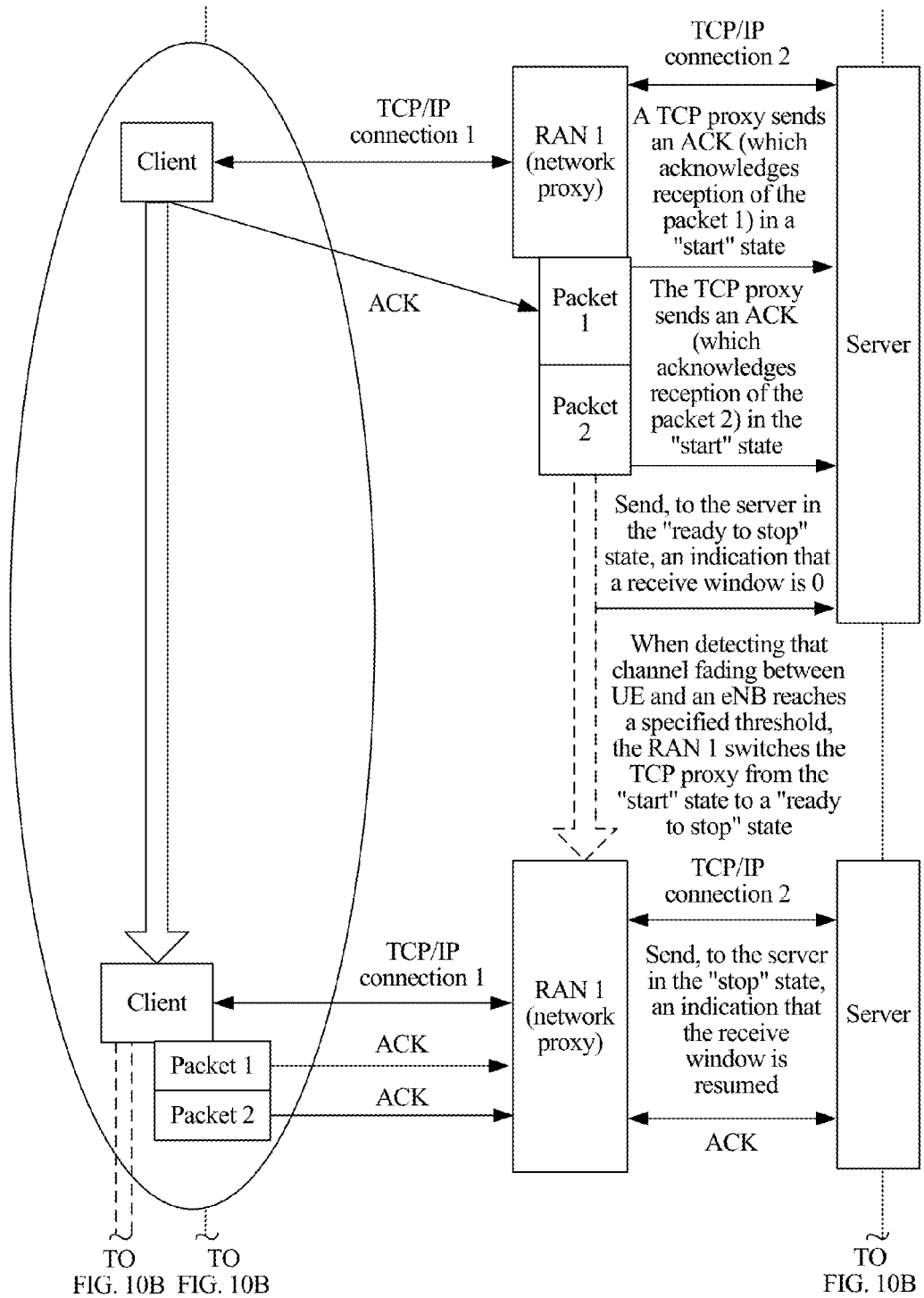
FIG. 10A and FIG. 10B are a schematic interaction diagram of another method for preventing TCP connection interruption according to an embodiment of the present invention.
Figure 10B:
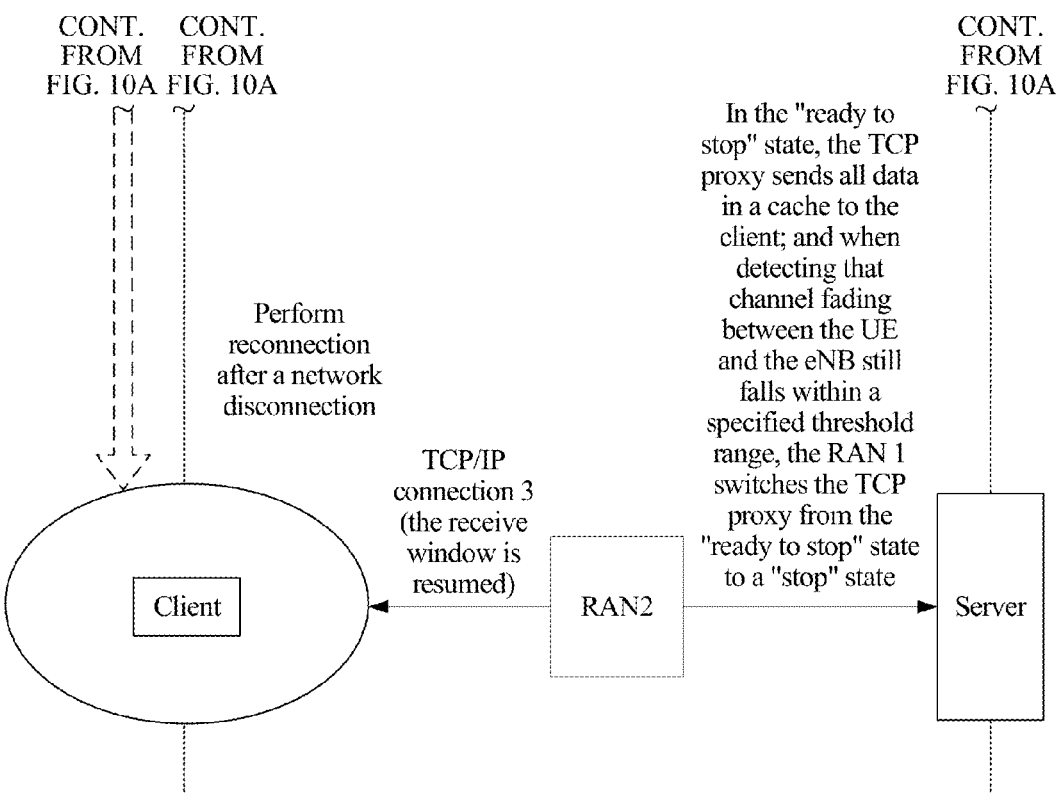

FIG. 10A and FIG. 10B are a schematic interaction diagram of another method for preventing TCP connection interruption according to an embodiment of the present invention. Referring to FIG. 10A and FIG. 10B, UE performs data transmission with a server in a scenario in which a RAN 1 has a TCP network proxy. A packet is forwarded between a client and the server by using the TCP network proxy, and the TCP network proxy is in a "start" state. After receiving a packet sent by the server, the TCP network proxy sends an acknowledgment to the server. The TCP network proxy caches partial data when a data transmission rate between the TCP network proxy and the server is greater than a data transmission rate between the client and the TCP network proxy. When detecting that channel fading between the UE and an eNB reaches a specified threshold, that is, a threshold 1, the RAN 1 switches the TCP proxy from the "start" state to a "ready to stop" state. When a switchover from the "start" state to the "ready to stop" state occurs, the TCP network proxy is triggered to send, to the server, an indication that a receive window is 0. The indication information may be carried in an acknowledgment sent by the TCP network proxy to the server. In the "ready to stop" state, that is, when the receive window of the TCP network proxy in the present invention is 0, after the server receives the indication that the receive window is 0, the server does not continue, according to a TCP protocol, sending downlink data. In the "ready to stop" state, the TCP proxy sends all the data in a cache to the client. In addition, when detecting that channel fading between the UE and the eNB falls within a specified threshold 4 range, the RAN 1 switches the TCP proxy from the "ready to stop" state to a "stop" state. When a switchover from the "ready to stop" state to the "stop" state occurs, the TCP network proxy is triggered to send, to the server, an indication that the receive window is resumed. The indication information may be set and carried in an acknowledgment of the client that is forwarded by the TCP network proxy to the server. When the TCP network proxy is in the "stop" state, interaction between the client and the server is directly completed by using a TCP connection 3 in the diagram. If reconnection is performed after a network disconnection (that is, in a process of moving from the RAN 1 to a RAN 2, the UE does not complete handover, and the UE is disconnected from the RAN 1 and performs reconnection to the RAN 2), the TCP connection 3 is not affected.

Figure 11A:
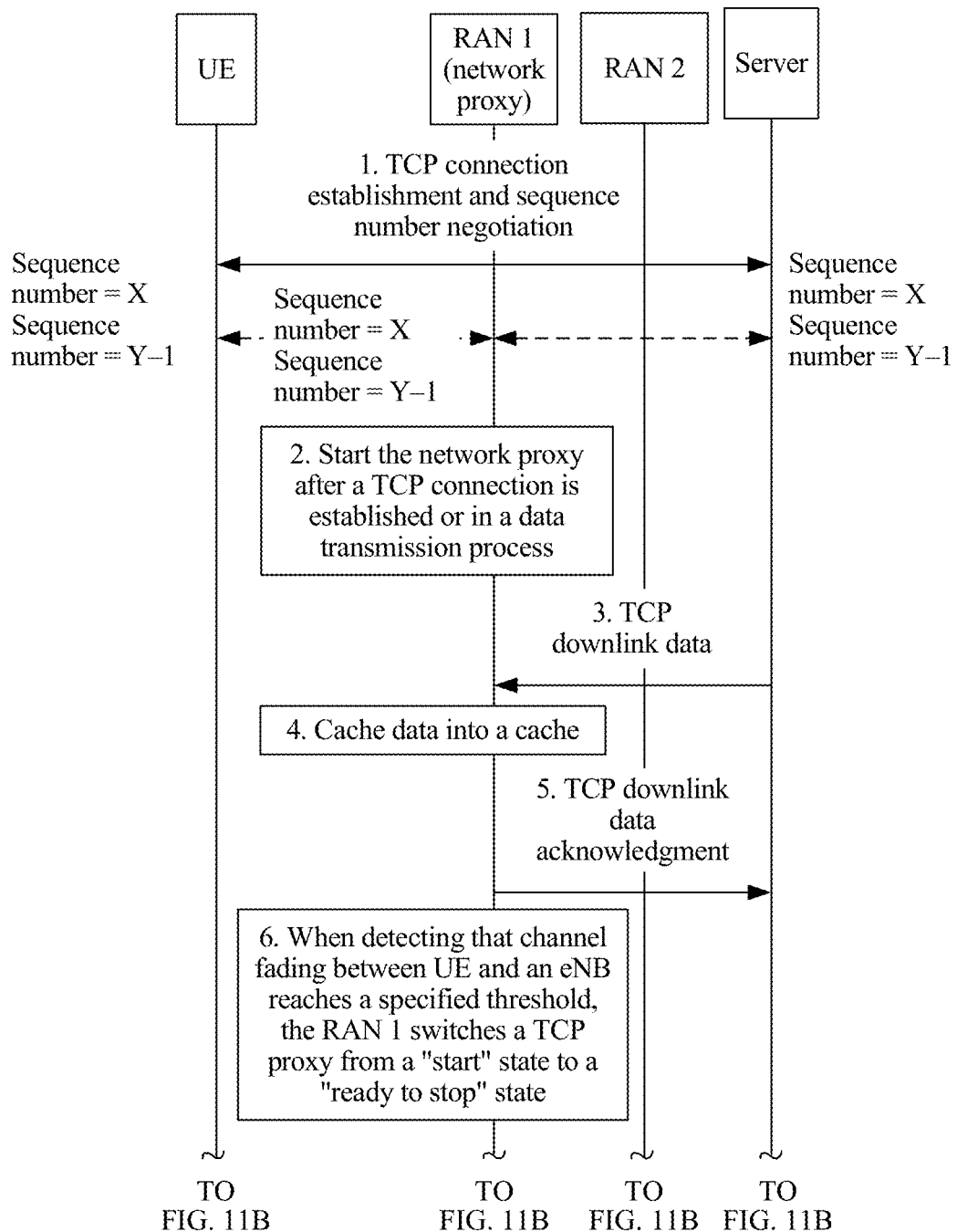
FIG. 11A and FIG. 11B are a schematic flowchart of another method for preventing TCP connection interruption according to an embodiment of the present invention.
Figure 11B:
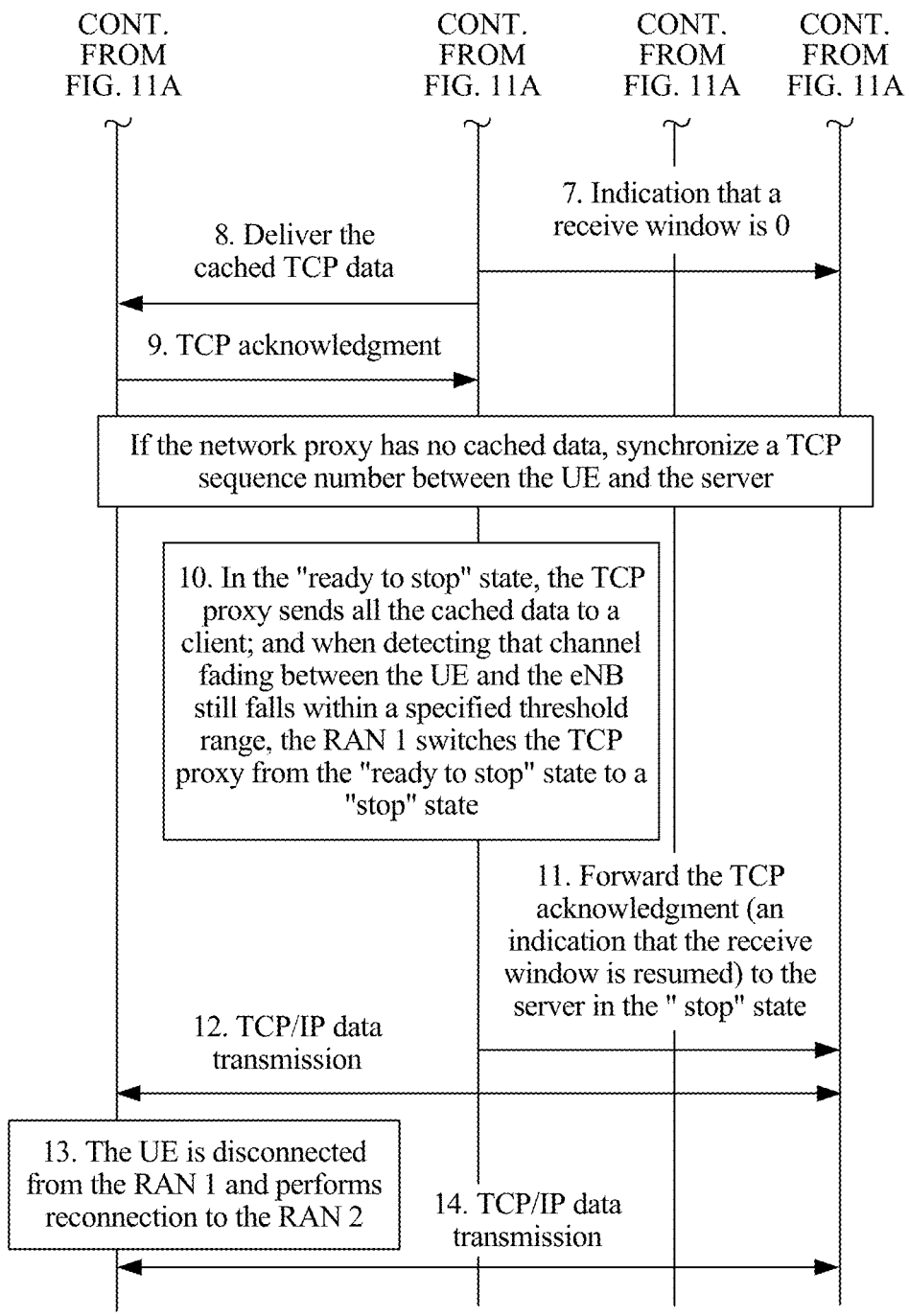

Further, FIG. 11A and FIG. 11B are a schematic flowchart of another method for preventing TCP connection interruption according to an embodiment of the present invention. Referring to FIG. 11A and FIG. 11B, an example that a proxy device sends cached downlink data is used. The procedure includes the following steps:

Step 1: Establish a TCP connection between a client and a server, so as to transmit data.

The client may be the UE, a sequence number X is a TCP sequence number of data sent by the UE to the server (that is, a TCP sequence number of uplink data), and a sequence number Y−1 is a TCP sequence number of data sent by the server to the UE (that is, a TCP sequence number of downlink data).

Step 2: Start a TCP network proxy after the TCP connection is established or in a data transmission process. In this case, the TCP network proxy is in a "start" state.

Step 3: The server sends downlink data to the client, where a packet is forwarded between the client and the server by using the TCP network proxy.

Step 4: The network proxy caches data when a data transmission rate between the TCP network proxy and the server is greater than a data transmission rate between the client and the TCP network proxy.

Step 5: After receiving a packet sent by the server, the TCP network proxy sends an acknowledgment to the server.

Step 6: When detecting that channel fading between UE and an eNB reaches a specified threshold, that is, a threshold 1, a RAN 1 switches the TCP proxy from the "start" state to a "ready to stop" state.

Step 7: When a switchover from the "start" state to the "ready to stop" state occurs, trigger the TCP network proxy to send, to the server, an indication that a receive window is 0. The indication information may be set and carried in an acknowledgment sent by the TCP network proxy to the server.

Step 8: The TCP network proxy forwards the cached data to the client.

Step 9: After receiving a packet sent by the TCP network proxy, the client sends an acknowledgment to the TCP network proxy.

Step 10: In the "ready to stop" state, the TCP proxy sends all the data in a cache to the client, and when detecting that channel fading between the UE and the eNB falls within a specified threshold 4 range, the RAN 1 switches the TCP proxy from the "ready to stop" state to a "stop" state.

Step 11: When a switchover from the "ready to stop" state to the "stop" state occurs, trigger the TCP network proxy to send, to the server, an indication that the receive window is resumed. The indication information may be set and carried in an acknowledgment of the client that is forwarded by the TCP network proxy to the server.

Specifically, the UE may continue, according to the receive window in a window (window) field of a header field in a TCP acknowledgment message, sending downlink data.

Step 12: When the TCP network proxy is in the "stop" state, the client and the server directly interact by using the TCP connection between the client and the server, so as to complete data transmission.

Step 13: Perform reconnection after a network disconnection (that is, in a process of moving from the RAN 1 to a RAN 2, the UE does not complete handover, and the UE is disconnected from the RAN 1 and performs reconnection to the RAN 2).

The client and the server continue data transmission by using the TCP connection between the client and the server, that is, reconnection performed after the network disconnection does not affect TCP data transmission.

In the embodiments corresponding to FIG. 6 to FIG. 11A and FIG. 11B, when a proxy device is in a "ready to stop" state, the proxy device needs to send a stop transmission instruction to a server or UE, so as to instruct the server or the UE to stop sending downlink data or uplink data. Only on this basis, the proxy device sends cached uplink data or cached downlink data. However, in this manner, a new instruction needs to be added; as a result, interaction overheads are increased. To avoid unnecessary overheads, the embodiments of the present invention provide another method for preventing TCP connection interruption. The following uses a specific embodiment for description.

Figure 12:
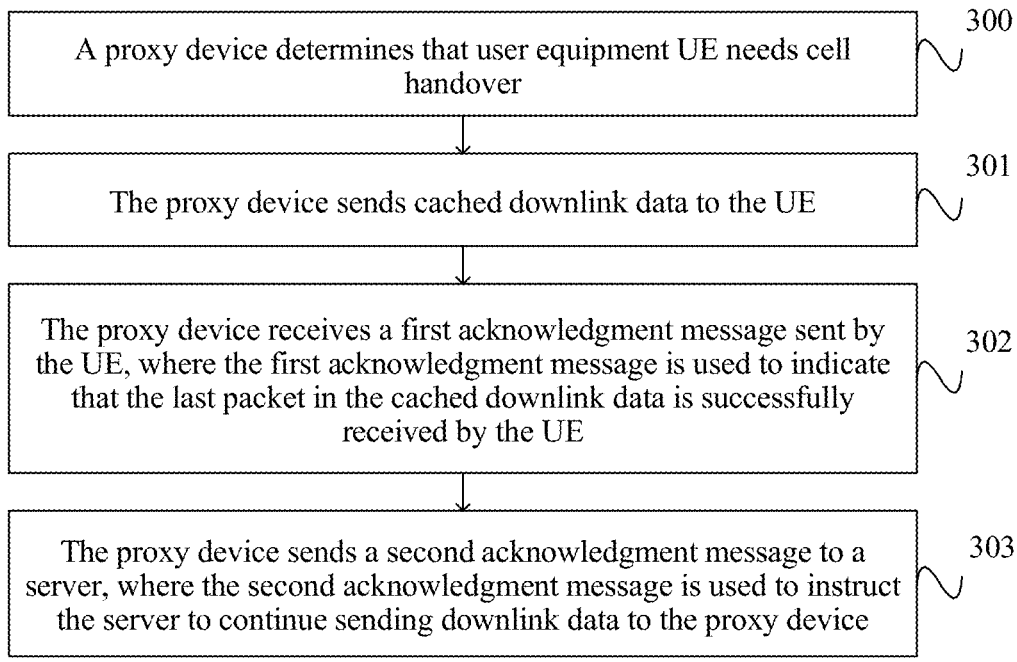
FIG. 12 is a schematic flowchart of another method for preventing TCP connection interruption according to an embodiment of the present invention.

FIG. 12 is a schematic flowchart of another method for preventing TCP connection interruption according to an embodiment of the present invention. An execution body is the apparatus for preventing TCP connection interruption. The apparatus for preventing TCP connection interruption is used as a proxy device. The proxy device may use the structure shown in FIG. 4 or FIG. 5, perform functions in a corresponding embodiment, and can implement a TCP proxy between a server and UE. Referring to FIG. 12, the method includes the following steps.

Step 300: A proxy device determines that user equipment UE needs cell handover.

Step 301: The proxy device sends cached downlink data to the UE.

Step 302: The proxy device receives a first acknowledgment message sent by the UE, where the first acknowledgment message is used to indicate that the last packet in the cached downlink data is successfully received by the UE.

Step 303: The proxy device sends a second acknowledgment message to a server, where the second acknowledgment message is used to instruct the server to continue sending the downlink data to the proxy device.

It should be noted that, only after receiving an acknowledgment message corresponding to the last packet in the cached downlink packets, that is, only after receiving the first acknowledgment message, the proxy device sends the second acknowledgment message to the server, so as to notify the server that the UE has successfully received the last packet in the cached downlink data.

According to the method for preventing TCP connection interruption provided in this embodiment of the present invention, a proxy device determines that user equipment UE needs cell handover; the proxy device sends cached downlink data to the UE; the proxy device receives a first acknowledgment message sent by the UE, where the first acknowledgment message is used to indicate that the last packet in the cached downlink data is successfully received by the UE; and the proxy device sends a second acknowledgment message to a server, where the second acknowledgment message is used to instruct the server to continue sending the downlink data to the proxy device. Therefore, the following problem is avoided: After UE is disconnected from a source cell and is connected to a new cell, because the UE does not receive partial downlink data cached by a TCP proxy or because partial cached data is lost, the UE initiates retransmission to a server, but the server does not retransmit an acknowledged packet according to a TCP protocol, causing TCP connection interruption and service interruption.

Figure 13:
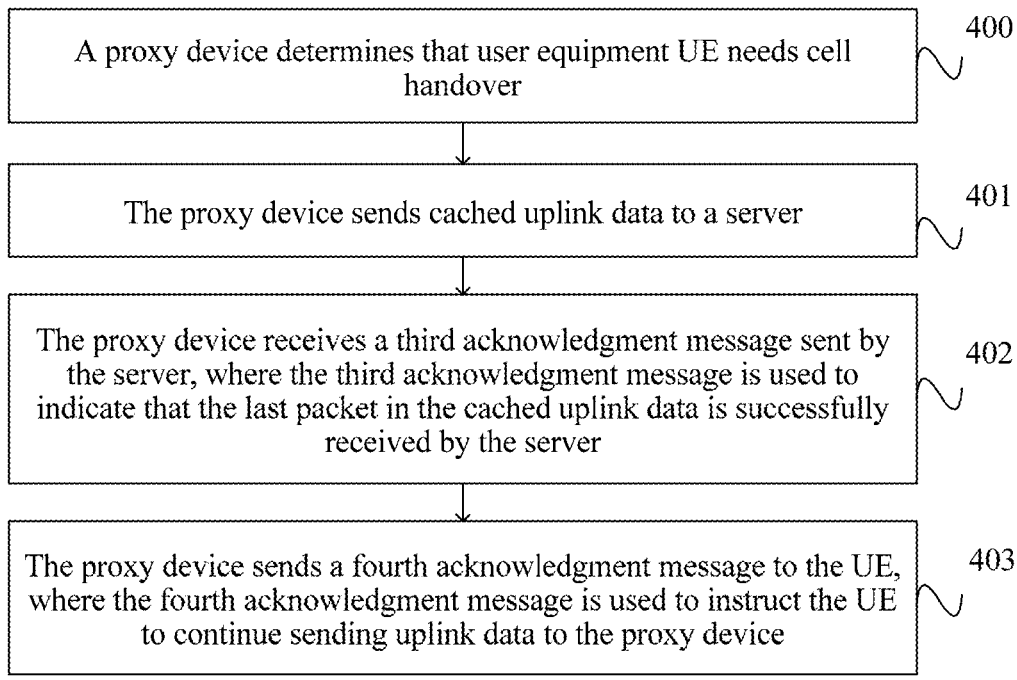
FIG. 13 is a schematic flowchart of another method for preventing TCP connection interruption according to an embodiment of the present invention.

Further, when a data transmission rate between the proxy device and the UE is greater than a data transmission rate between the server and the proxy device, partial uplink data is cached into the proxy device within a time period. Usually, the proxy device separately configures two caches that are respectively used to buffer uplink data and downlink data. A processing process in which the proxy device empties the cached downlink data (referring to step 300 to step 304) and a processing process in which the proxy device empties the cached uplink data may be independent from each other, or may be performed simultaneously. The following uses a specific embodiment to describe a solution for emptying the cached uplink data. FIG. 13 is a schematic flowchart of another method for preventing TCP connection interruption according to an embodiment of the present invention. The proxy device may use the structure shown in FIG. 4 or FIG. 5, and perform functions in a corresponding embodiment.

Referring to FIG. 13, the method includes the following steps:

Step 400: A proxy device determines that user equipment UE needs cell handover.

Step 401: The proxy device sends cached uplink data to a server.

Step 402: The proxy device receives a third acknowledgment message sent by the server, where the third acknowledgment message is used to indicate that the last packet in the cached uplink data is successfully received by the server.

Step 403: The proxy device sends a fourth acknowledgment message to the UE, where the fourth acknowledgment message is used to instruct the UE to continue sending the uplink data to the proxy device. The fourth acknowledgment message may be the third acknowledgment message that is sent by the server and that is forwarded by the proxy device to the UE.

Specifically, the UE may continue, according to a receive window in a window (window) field of a header field in a TCP acknowledgment message, sending uplink data.

It should be noted that step 400 is totally the same as the foregoing step 300, and it can be learned that step 401 to step 403 in this solution may be performed at the same time as the embodiment corresponding to FIG. 12. Step 401 to step 403 can be performed provided that the proxy device caches uplink data.

According to the method for preventing TCP connection interruption provided in this embodiment of the present invention, a proxy device determines that user equipment UE needs cell handover; the proxy device sends cached uplink data to a server; the proxy device receives a third acknowledgment message sent by the server, where the third acknowledgment message is used to indicate that the last packet in the cached uplink data is successfully received by the server; and the proxy device sends a fourth acknowledgment message to the UE, where the fourth acknowledgment message is used to instruct the UE to continue sending the uplink data to the proxy device. Therefore, the following problem is avoided: After UE is disconnected from a source cell and is connected to a new cell, because a server does not receive partial uplink data cached by a TCP proxy or because partial cached data is lost, the server initiates retransmission to the UE, but the UE does not retransmit an acknowledged packet according to a TCP protocol, causing TCP connection interruption and service interruption.

Preferably, in step 300 and step 400, for how to determine that cell handover is about to be performed for the UE, the following provides one feasible implementation manner:

If the proxy device detects that channel fading between the UE and a wireless access device in a source cell reaches a threshold range, the proxy device determines that cell handover is about to be performed for the UE.

Further, after the proxy device sends the cached downlink data to the UE, or after the proxy device sends the cached uplink data to the server, the method further includes:

if channel fading between the UE and the wireless access device in the source cell still falls within the threshold range, stopping, by the proxy device, providing a proxy service for the UE.

The threshold range has described in the foregoing description. Details are not described herein again.

The following uses an example that a proxy device caches downlink data, to describe the methods shown in FIG. 12 and FIG. 13.

Figure 14A:
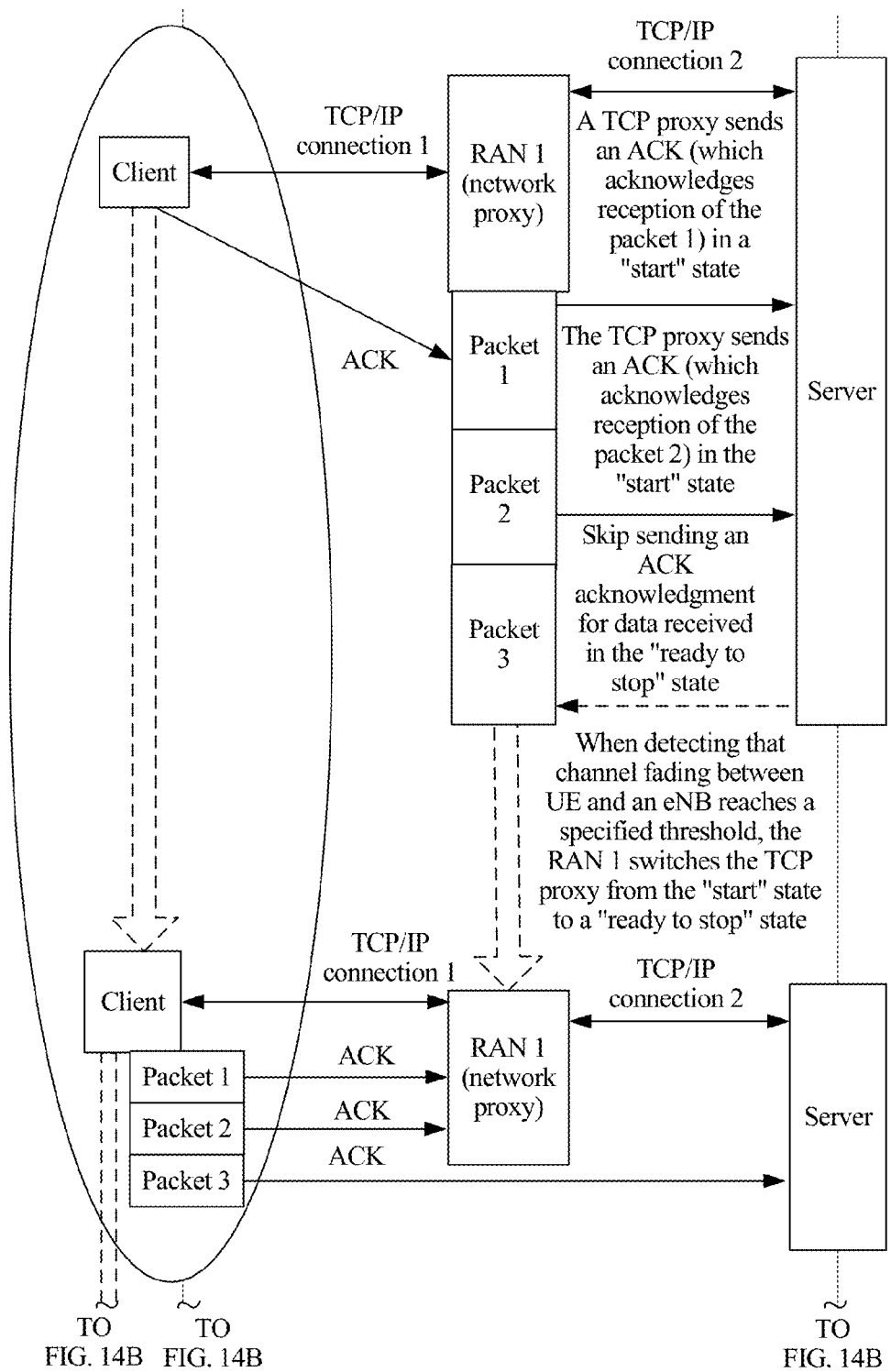
FIG. 14A and FIG. 14B are a schematic interaction diagram of another method for preventing TCP connection interruption according to an embodiment of the present invention.
Figure 14B:
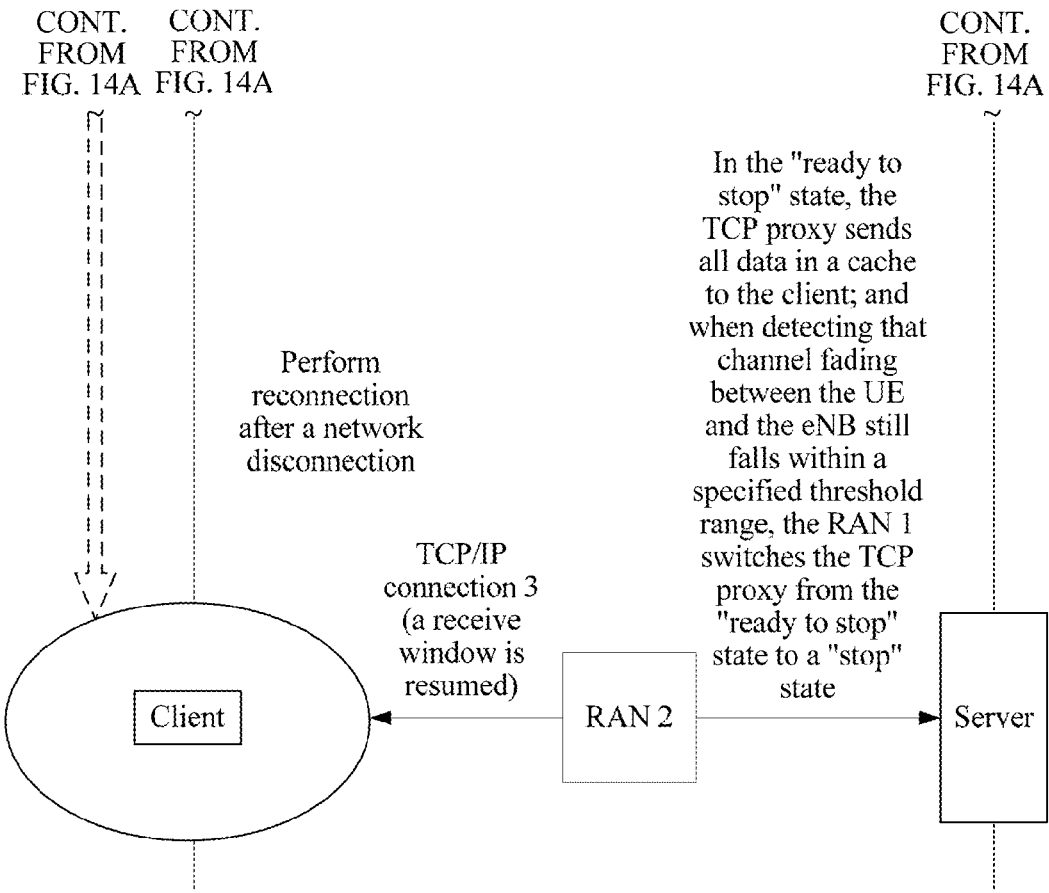

FIG. 14A and FIG. 14B are a schematic interaction diagram of another method for preventing TCP connection interruption according to an embodiment of the present invention. Referring to FIG. 14A and FIG. 14B, a difference between this embodiment corresponding to FIG. 14A and FIG. 14B and the embodiments corresponding to FIG. 6 to FIG. 9 is as follows: In the embodiments corresponding to FIG. 6 to FIG. 9, when a switchover from a "start" state to a "ready to stop" state occurs, a TCP network proxy is triggered to send, to a server, an indication that a receive window is 0; referring to FIG. 14A and FIG. 14B, a setting of the TCP network proxy needs to be modified, and it is set that no acknowledgment ACK is sent for data received in the "ready to stop" state.

Referring to FIG. 14A and FIG. 14B, UE performs data transmission with a server in a scenario in which a RAN 1 has a TCP network proxy. A packet is forwarded between a client and the server by using the TCP network proxy, and the TCP network proxy is in a "start" state. After receiving a packet sent by the server, the TCP network proxy sends an acknowledgment to the server. The TCP network proxy caches partial data when a data transmission rate between the TCP network proxy and the server is greater than a data transmission rate between the client and the TCP network proxy. When detecting that channel fading between the UE and an eNB reaches a specified threshold, that is, a threshold 1, the RAN 1 switches the TCP proxy from the "start" state to a "ready to stop" state. In the "ready to stop" state, in this embodiment, a setting of the TCP network proxy needs to be modified, and it is set that no ACK acknowledgment is sent for data received in the "ready to stop" state. The TCP network proxy may continue receiving a packet from the server, and forwarding the packet to the client, but the TCP network proxy sends no acknowledgment of the packet to the server. In the "ready to stop" state, the TCP proxy sends all the data in a cache to the client. In addition, when detecting that channel fading between the UE and the eNB falls within a specified threshold 4 range, the RAN 1 switches the TCP proxy from the "ready to stop" state to a "stop" state. When the TCP network proxy is in the "stop" state, interaction between the client and the server is directly completed by using a TCP connection 3 in the diagram. If reconnection is performed after a network disconnection (that is, in a process of moving from the RAN 1 to a RAN 2, the UE does not complete handover, and the UE is disconnected from the RAN 1 and performs reconnection to the RAN 2), the TCP connection 3 is not affected.

In comparison with the foregoing embodiment, in a scenario in which a proxy device sends cached uplink data, it should be noted that UE performs data transmission with a server in a scenario in which a RAN 1 has a TCP network proxy. An uplink packet is forwarded between the UE and the server by using the TCP network proxy, and the TCP network proxy is in a "start" state. After receiving an uplink packet sent by the UE to the server, the TCP network proxy sends an acknowledgment to the UE. The network proxy caches partial data when a data transmission rate between the TCP network proxy and the UE is greater than a data transmission rate between the TCP network proxy and the server. When detecting that channel fading between the UE and an eNB reaches a specified threshold, that is, a threshold 1, the RAN 1 switches the TCP proxy from the "start" state to a "ready to stop" state. When a switchover from the "start" state to the "ready to stop" state occurs, the TCP network proxy is triggered to send, to the UE, an indication that a receive window is 0. The indication information may be set and carried in an acknowledgment sent by the TCP network proxy to the UE. In the "ready to stop" state, that is, when the receive window of the TCP network proxy in the present invention is 0, after the UE receives the indication that the receive window is 0, the UE does not continue, according to a TCP protocol, sending uplink data. In the "ready to stop" state, the TCP proxy sends all the data in a cache to the server. In addition, when detecting that channel fading between the UE and the eNB still falls within a specified threshold 4 range, the RAN 1 switches the TCP proxy from the "ready to stop" state to a "stop" state. When a switchover from the "ready to stop" state to the "stop" state occurs, the TCP network proxy is triggered to send, to the UE, an indication that the receive window is resumed. The indication information may be set and carried in an acknowledgment of the server that is forwarded by the TCP network proxy to the server.

Figure 15:
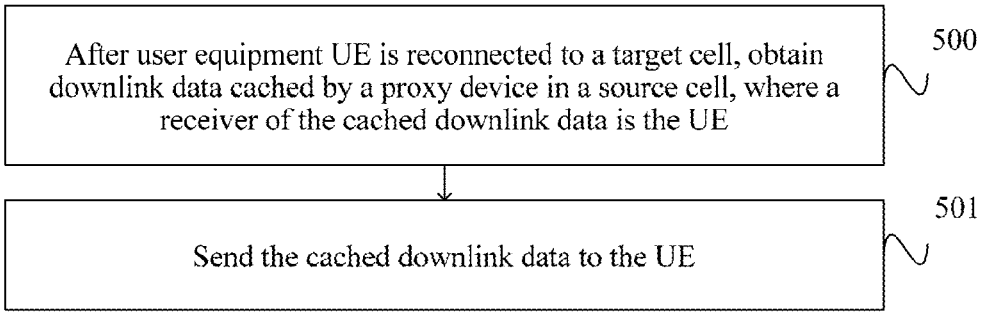
FIG. 15 is a schematic flowchart of another method for preventing TCP connection interruption according to an embodiment of the present invention.

Further, in the foregoing embodiment, the proxy device sends cached data before cell handover is performed for the UE. The following embodiment of the embodiments of the present invention provides a manner in which an access device sends cached downlink data after cell handover is performed for the UE. FIG. 15 is a schematic flowchart of another method for preventing TCP connection interruption according to an embodiment of the present invention. The method is executed by an access device in a cell to which UE belongs after the UE implements handover. The device may use the structure shown in FIG. 4 or FIG. 5, and perform functions in a corresponding embodiment. The device may have or may not have a TCP proxy function. Referring to FIG. 15, the method includes the following steps:

Step 500: After user equipment UE is reconnected to a target cell, obtain downlink data cached by a proxy device in a source cell, where a receiver of the cached downlink data is the UE.

Specifically, the target cell is a cell to which the UE belongs after the UE completes handover. This embodiment is executed by an access device in the target cell.

Step 501: Send the cached downlink data to the UE.

According to the method for preventing TCP connection interruption provided in this embodiment of the present invention, after user equipment UE is reconnected to a target cell, an access device obtains downlink data cached by a proxy device in a source cell, where a receiver of the cached downlink data is the UE; and the access device sends the cached downlink data to the user equipment UE. Therefore, the downlink data cached by the proxy device is sent to the UE, no TCP connection interruption occurs, and communication stability is improved. Therefore, the following problem is avoided: After UE is handed over to a target cell, because the UE does not receive previous downlink data, the UE initiates a retransmission request to a server, but the server does not retransmit, according to a TCP protocol, data whose ACK acknowledgment has been received, causing TCP connection interruption.

Further, step 500 may be implemented in two feasible manners: passive receiving and active obtaining. Implementation manners of passive receiving and active obtaining are as follows:

Manner 1: receiving the cached downlink data and an identifier of the UE that are sent by the proxy device in the source cell.

Manner 2: sending a request message to the proxy device in the source cell, where the request message includes an identifier of the UE; and receiving the cached downlink data sent by the proxy device in the source cell.

Specifically, the sending a request message to the proxy device in the source cell includes:

sending the request message to the proxy device in the source cell according to an identifier of the source cell.

The receiving the cached downlink data and an identifier of the UE that are sent by the proxy device in the source cell includes:

receiving, according to an identifier of the source cell, the cached downlink data and the identifier of the UE that are sent by the proxy device in the source cell.

Figure 16:
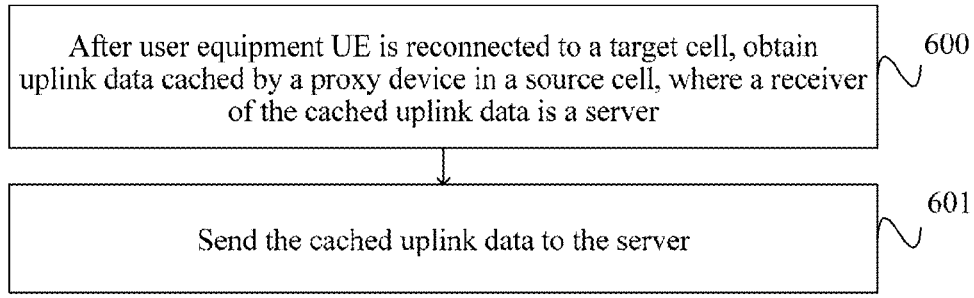
FIG. 16 is a schematic flowchart of another method for preventing TCP connection interruption according to an embodiment of the present invention.

Further, the access device may further send uplink data cached by the proxy device in the source cell to the server. It should be noted that, a step that the access device sends the uplink data to the server may be performed at the same time as step 500 and step 501, or may be performed independently. FIG. 16 is a schematic flowchart of another method for preventing TCP connection interruption according to an embodiment of the present invention. The access device may use the structure shown in FIG. 4 or FIG. 5, and perform functions in a corresponding embodiment. Referring to FIG. 16, the method includes the following steps:

Step 600: After user equipment UE is reconnected to a target cell, obtain uplink data cached by a proxy device in a source cell, where a receiver of the cached uplink data is a server.

Step 601: Send the cached uplink data to the server.

According to the method for preventing TCP connection interruption provided in this embodiment of the present invention, after user equipment UE is reconnected to a target cell, an access device obtains uplink data cached by a proxy device in a source cell, where a receiver of the cached uplink data is a server; and the access device sends the cached uplink data to the server. Therefore, the uplink data cached by the proxy device is sent to the server, no TCP connection interruption occurs, and communication stability is improved. Therefore, the following problem is avoided: After UE is handed over to a target cell, because a server does not receive previous uplink data, the server initiates a retransmission request to the UE, but the UE does not retransmit, according to a TCP protocol, data whose ACK acknowledgment has been received, causing TCP connection interruption.

Referring to the implementation manners of step 500, step 600 may also have two implementation manners. If step 600 is performed at the same time as step 500, a push message further includes the cached uplink data, or a data request message further includes the cached uplink data.

If step 600 and step 601 are performed independently, feasible implementation manners of step 600 are as follows:

Manner 1: receiving the cached downlink data and an identifier of the UE that are sent by the proxy device in the source cell.

Manner 2: sending a request message to the proxy device in the source cell, where the request message includes an identifier of the UE; and receiving the cached downlink data sent by the proxy device in the source cell.

Specifically, the sending a request message to the proxy device in the source cell includes:

sending the request message to the proxy device in the source cell according to an identifier of the source cell.

The receiving the push message sent by the proxy device in the source cell includes:

receiving, according to an identifier of the source cell, the cached uplink data and the identifier of the UE that are sent by the proxy device in the source cell.

The following uses specific examples to describe the embodiments corresponding to FIG. 15 and FIG. 16. It should be noted that unless otherwise stated, downlink data cached by a proxy device is used as an example in the following for description.

Figure 17:
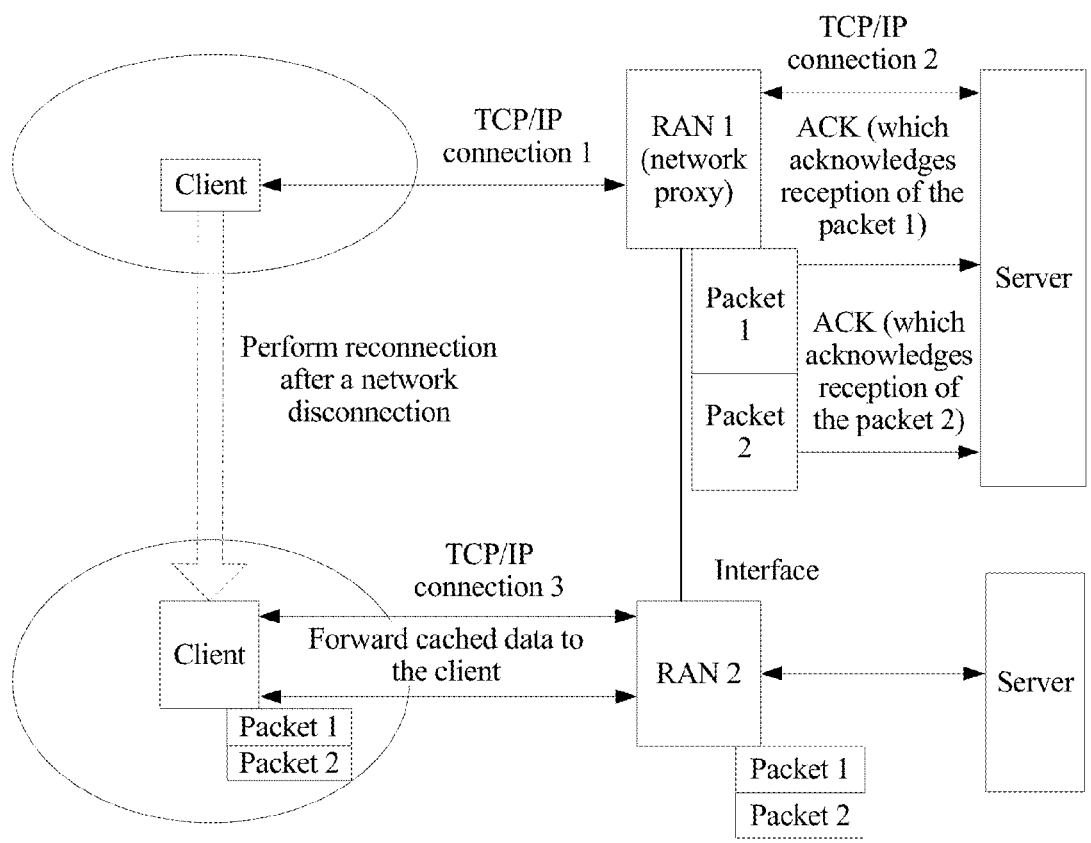
FIG. 17 is a schematic interaction diagram of another method for preventing TCP connection interruption according to an embodiment of the present invention.

FIG. 17 is a schematic interaction diagram of another method for preventing TCP connection interruption according to an embodiment of the present invention. Referring to FIG. 17, when UE is disconnected from a RAN 1 and performs reconnection to a RAN 2, an identifier of the RAN 1 (such as a cell ID and/or a base station ID (such as an eNB ID)) is carried. The RAN 2 requests, from the RAN 1, data cached in the RAN 1 before reconnection is performed. After receiving the cached data sent by the RAN 1, the RAN 2 forwards the cached data to the UE. In this scenario, whether the RAN 2 has a TCP network proxy does not affect implementation of this solution.

Figure 18:
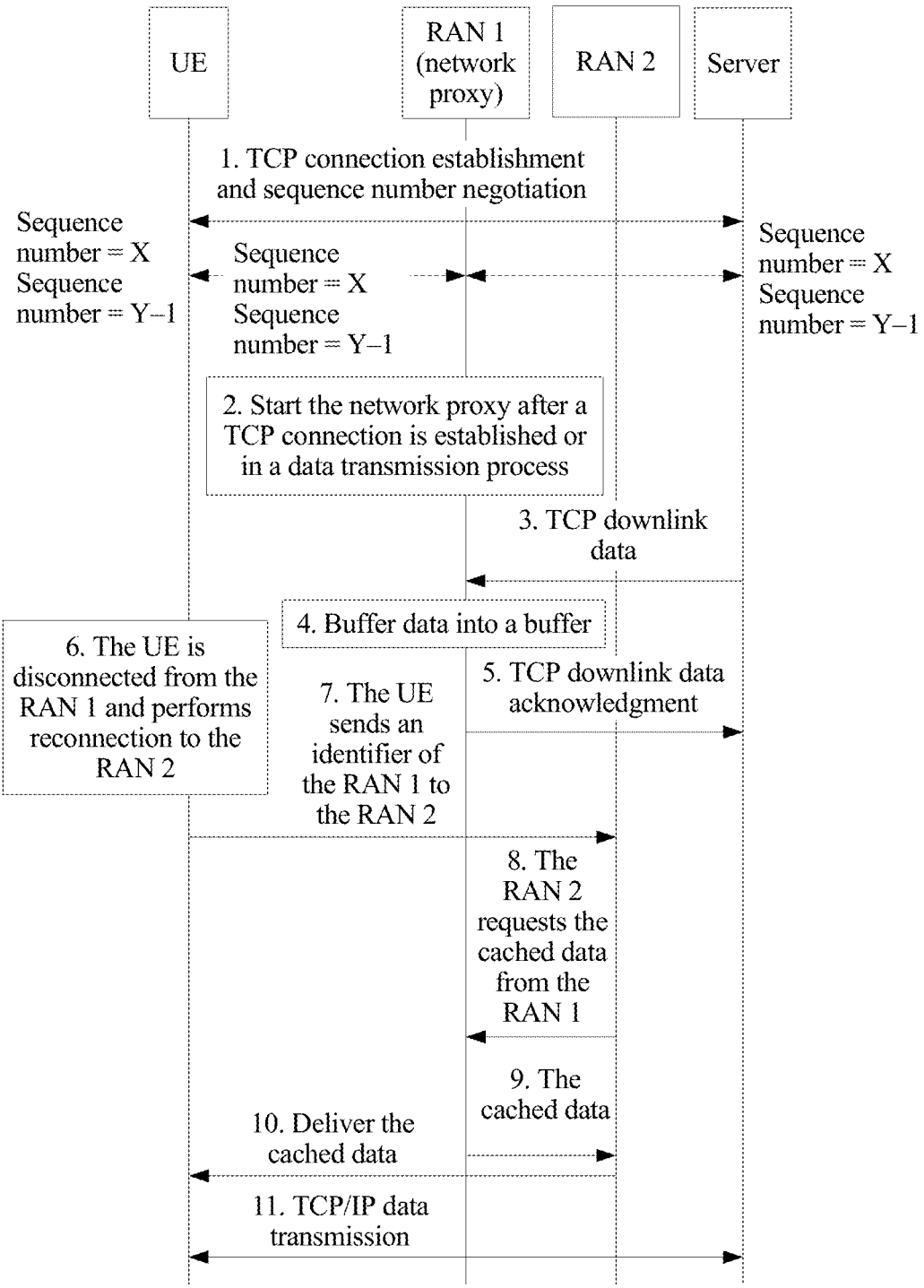
FIG. 18 is a schematic flowchart of another method for preventing TCP connection interruption according to an embodiment of the present invention.

Further, FIG. 18 is a schematic flowchart of another method for preventing TCP connection interruption according to an embodiment of the present invention. Referring to FIG. 18, an example that a proxy device sends cached downlink data is used. The procedure includes the following steps:

Step 1: Establish a TCP connection between a client and a server, so as to transmit data.

Specifically, the client may be the UE.

Step 2: Start a TCP network proxy after the TCP connection is established or in a data transmission process.

Step 3: The server sends downlink data to the client, where a packet is forwarded between the client and the server by using the TCP network proxy.

Step 4: The network proxy caches data when a data transmission rate between the TCP network proxy and the server is greater than a data transmission rate between the client and the TCP network proxy.

Step 5: After receiving a packet sent by the server, the TCP network proxy sends a downlink data acknowledgment to the server.

Step 6: Perform reconnection after a network disconnection (that is, in a process of moving from a RAN 1 to a RAN 2, UE does not complete handover, and the UE is disconnected from the RAN 1 and performs reconnection to the RAN 2).

Step 7: The UE sends an identifier (which may be carried in signaling for performing reconnection to the RAN 2 by the UE) of the RAN 1 to the RAN 2.

Step 8: The RAN 2 requests the cached data from the RAN 1 according to the identifier of the RAN 1.

Step 9: The RAN 1 sends the cached data to the RAN 2.

Step 10: The RAN 2 forwards the cached data to the UE.

Step 11: The client and the server continue data transmission by using the TCP connection between the client and the server.

Figure 19:
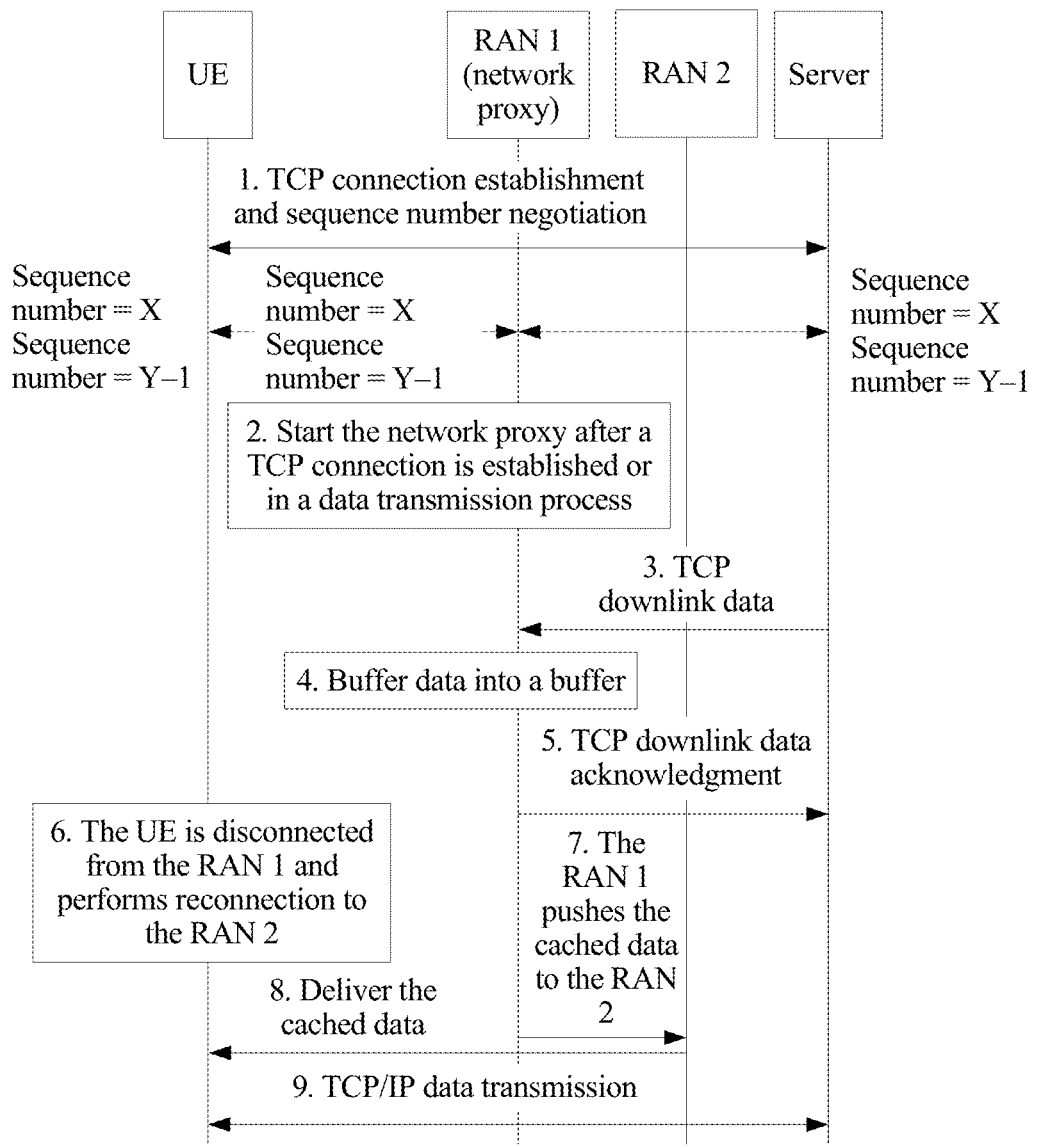
FIG. 19 is a schematic flowchart of another method for preventing TCP connection interruption according to an embodiment of the present invention.

FIG. 19 is a schematic flowchart of another method for preventing TCP connection interruption according to an embodiment of the present invention. A difference between the embodiment corresponding to FIG. 19 and the embodiment corresponding to FIG. 18 is as follows: In the embodiment corresponding to FIG. 18, a RAN 2 requests cached data from a RAN 1; in the embodiment corresponding to FIG. 19, the RAN 1 pushes the cached data to the RAN 2. The embodiment corresponding to FIG. 19 is described as follows: After finding that UE is disconnected from the RAN 1, the RAN 1 pushes, to an adjacent RAN around the RAN 1, data cached in the RAN 1 before the network disconnection; and after receiving the cached data sent by the RAN 1, the RAN 2 forwards the cached data to the UE. In this scenario, whether the RAN 2 has a TCP network proxy does not affect implementation of this solution.

Referring to FIG. 19, an example that a proxy device sends cached downlink data is used. The procedure includes the following steps:

Step 1: Establish a TCP connection between a client and a server, so as to transmit data.

Step 2: Start a TCP network proxy after the TCP connection is established or in a data transmission process.

Step 3: The server sends downlink data to the client, where a packet is forwarded between the client and the server by using the TCP network proxy.

Step 4: The network proxy caches data when a data transmission rate between the TCP network proxy and the server is greater than a data transmission rate between the client and the TCP network proxy.

Step 5: After receiving a packet sent by the server, the TCP network proxy sends a downlink data acknowledgment to the server.

Step 6: Perform reconnection after a network disconnection (that is, in a process of moving from a RAN 1 to a RAN 2, UE does not complete handover, and the UE is disconnected from the RAN 1 and performs reconnection to the RAN 2).

Step 7: After finding that the UE is disconnected from the RAN 1, the RAN 1 pushes, to an adjacent RAN around the RAN 1, the data cached in the RAN 1 before the network disconnection; and the RAN 2 requests the cached data from the RAN 1 according to an identifier of the RAN 1.

Step 8: The RAN 2 forwards the cached data to the UE.

Step 9: The client and the server continue data transmission by using the TCP connection between the client and the server.

Persons of ordinary skill in the art may understand that all or some of the steps of the method embodiments may be implemented by a program instructing relevant hardware. The program may be stored in a computer readable storage medium. When the program runs, the steps of the method embodiments are performed. The storage medium includes any medium that can store program code, such as a ROM, a RAM, a magnetic disk, or an optical disc.

Finally, it should be noted that the embodiments are only intended for describing the technical solutions of the present invention, but not for limiting the present invention. Although the present invention is described in detail with reference to the embodiments, persons of ordinary skill in the art should understand that they may still make modifications to the technical solutions described in the embodiments or make equivalent replacements to some or all technical features of the technical solutions, without departing from the scope of the technical solutions of the embodiments of the present invention.

What is claimed is:

1. An apparatus for preventing TCP connection interruption, the apparatus comprising:
a processor, configured to determine that user equipment (UE) needs cell handover when it is detected that channel fading between the UE and a wireless access device in a source cell reaches a threshold range;
a transceiver, configured to:
send a first instruction message to a server for instructing the server to stop sending downlink data to a proxy device, and
send cached downlink data to the UE; and
wherein the processor is configured to:
after the transceiver sends the cached downlink data to the UE, or after the transceiver sends cached uplink data to the server, when channel fading between the UE and the wireless access device in the source cell falls within the threshold range, stop providing a proxy service for the UE.

2. The apparatus according to claim 1, wherein the transceiver is configured to:
when it is acknowledged that all the cached downlink data is sent, instruct the server to continue sending downlink data.

3. The apparatus according to claim 2, wherein the transceiver is configured to:
receive a first acknowledgment message sent by the UE for indicating that the last packet in the cached downlink data is successfully received by the UE; and
send a second acknowledgment message to the server for instructing the server to continue sending the downlink data to the transceiver.

4. The apparatus according to claim 1, wherein the transceiver is configured to:
send a second instruction message to the UE for instructing the UE to stop sending uplink data to the proxy device; and
send cached uplink data to the server.

5. The apparatus according to claim 4, wherein the transceiver is configured to:

when it is acknowledged that all the cached uplink data is sent, instruct the UE to continue sending the uplink data.

6. The apparatus according to claim 5, wherein the transceiver is configured to:
receive a third acknowledgment message sent by the server for indicating that the last packet in the cached uplink data is successfully received by the server; and
send a fourth acknowledgment message to the UE for instructing the UE to continue sending the uplink data to the transceiver.

7. An apparatus for preventing TCP connection interruption, the apparatus comprising:
a processor, configured to determine that user equipment (UE) needs cell handover when it is detected that channel fading between the UE and a wireless access device in a source cell reaches a threshold range;
a transceiver, configured to:
send an instruction message to the UE for instructing the UE to stop sending uplink data to a proxy device, and
send cached uplink data to a server; and
wherein the processor is configured to:
after the transceiver sends the cached uplink data to the server, when channel fading between the UE and the wireless access device in the source cell still falls within the threshold range, cause the proxy device to stop providing a proxy service for the UE.

8. The apparatus according to claim 7, wherein the transceiver is configured to:
when it is acknowledged that all the cached uplink data is sent, instruct the UE to continue sending the uplink data.

9. The apparatus according to claim 8, wherein the transceiver is configured to:
receive a third acknowledgment message sent by the server for indicating that the last packet in the cached uplink data is successfully received by the server; and
send a fourth acknowledgment message to the UE for instructing the UE to continue sending the uplink data to the transceiver.

10. A method for preventing TCP connection interruption, the method comprising:
determining, by a proxy device, that user equipment (UE) needs cell handover when the proxy device detects that channel fading between the UE and a wireless access device in a source cell reaches a threshold range;
sending, by the proxy device, a first instruction message to a server for instructing the server to stop sending downlink data to the proxy device;
sending, by the proxy device, cached downlink data to the UE; and
when channel fading between the UE and the wireless access device in the source cell falls within the threshold range, stopping provision of a proxy service for the UE.

11. The method according to claim 10, comprising:
when the proxy device acknowledges that all the cached downlink data is sent, instructing, by the proxy device, the server to continue sending the downlink data.

12. The method according to claim 11, wherein instructing, by the proxy device, the server to continue sending the downlink data comprises:
receiving, by the proxy device, a first acknowledgment message sent by the UE for indicating that the last packet in the cached downlink data is successfully received by the UE; and
sending, by the proxy device, a second acknowledgment message to the server for instructing the server to continue sending the downlink data to the proxy device.

13. The method according to claim 10, comprising:
sending, by the proxy device, a second instruction message to the UE for instructing the UE to stop sending uplink data to the proxy device; and
sending, by the proxy device, cached uplink data to the server.

14. The method according to claim 13, comprising:
when the proxy device acknowledges that all the cached uplink data is sent, instructing, by the proxy device, the UE to continue sending the uplink data.

15. The method according to claim 14, wherein instructing, by the proxy device, the UE to continue sending the uplink data comprises:
receiving, by the proxy device, a third acknowledgment message sent by the server for indicating that the last packet in the cached uplink data is successfully received by the server; and
sending, by the proxy device, a fourth acknowledgment message to the UE for instructing the UE to continue sending the uplink data to the proxy device.

* * * * *